(12) United States Patent
Marason et al.

(10) Patent No.: US 9,465,988 B1
(45) Date of Patent: Oct. 11, 2016

(54) CAMERA AND ILLUMINATOR FOR IRIS IMAGING IN CELL PHONES AND TABLETS

(71) Applicant: Amazon Technologies, Inc., Seattle, WA (US)

(72) Inventors: Eric Gifford Marason, San Francisco, CA (US); Serkan Hatipoglu, Santa Clara, CA (US); Miguel Virgen, Santa Clara, CA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 34 days.

(21) Appl. No.: 14/572,915

(22) Filed: Dec. 17, 2014

(51) Int. Cl.
*G06K 9/20* (2006.01)
*G06K 9/00* (2006.01)

(52) U.S. Cl.
CPC ............................. *G06K 9/00604* (2013.01)

(58) Field of Classification Search
None
See application file for complete search history.

(56) References Cited

U.S. PATENT DOCUMENTS

| | | | |
|---|---|---|---|
| 5,291,560 A | 3/1994 | Daugman | |
| 8,085,994 B2 | 12/2011 | Kim | |
| 8,212,870 B2 | 7/2012 | Hanna et al. | |
| 2010/0183199 A1* | 7/2010 | Smith | G06F 19/322 382/117 |
| 2011/0261247 A1* | 10/2011 | Mathieu | G02B 13/0025 348/340 |
| 2013/0088584 A1 | 4/2013 | Malhas et al. | |
| 2013/0188077 A1* | 7/2013 | DeLuca | H04N 5/217 348/242 |
| 2015/0362700 A1* | 12/2015 | Prabhakar | G06K 9/00604 348/78 |

OTHER PUBLICATIONS

Daugman, John. How Iris Recognition Works. Circuits and Systems for Video Technology, IEEE Transactions. vol. 14, No. 1: pp. 21-30, 2004.
Daugman, John. Results From 200 Billion Iris Cross-Comparisions. University of Cambridge Technical Report UCAM-CL-TR-635, 2005.
Daugman, John. The Importance of Being Random: Statistical Principles of Iris Recognition. Pattern Recognition. vol. 36, No. 2: pp. 279-291, 2003.

* cited by examiner

*Primary Examiner* — Brian P Werner
(74) *Attorney, Agent, or Firm* — Seyfarth Shaw LLP; Ilan N. Barzilay; David A. Klein

(57) ABSTRACT

An electronic device including an illuminator and a camera configured for performing iris recognition while the user holds the device. The lens of the camera comprises four molded plastic elements with eight aspheric surfaces at a total thickness of only 3.4 mm that provides a mildly distorted image 1.2 mm across. The relative aperture is 3.5 with a fixed focal distance, providing a depth-of-field spanning a fixed focus region of at least 10 cm in depth that is 25 to 35 cm (centimeters) from the eye. The illuminator comprises a near-IR LED in a Cassegrain telescope configuration for efficient directing of flux toward the eye, thereby conserving device volume and electric energy use.

20 Claims, 18 Drawing Sheets

CAMERA AND ILLUMINATOR FOR IRIS IMAGING IN CELL PHONES AND TABLETS

BACKGROUND

Consumer electronic devices such as cellular telephones typically contain confidential personal information, and increasingly are used to make point-of-sale payments. New security measures are being added to protect this confidential information and to authenticate financial transactions conducted using the devices, including the addition of biometric interfaces such as fingerprint scanners and iris recognition.

BRIEF DESCRIPTION OF DRAWINGS

For a more complete understanding of the present disclosure, reference is now made to the following description taken in conjunction with the accompanying drawings.

DETAILED DESCRIPTION

As consumer purchasing via cellular telephone and tablet devices increases, so does the need for prevention of fraudulent transactions. One way to strengthen security and ensure purchaser identity is to acquire biometric data, such as an iris image, at the time of transaction. The challenge is to make this convenient for the user and to fit within the thin profile, limited volume, and battery budget of today's devices. Users will want to acquire the iris image at arm's length with a single hand in light or dark surroundings without concern for focus.

Figure 1:
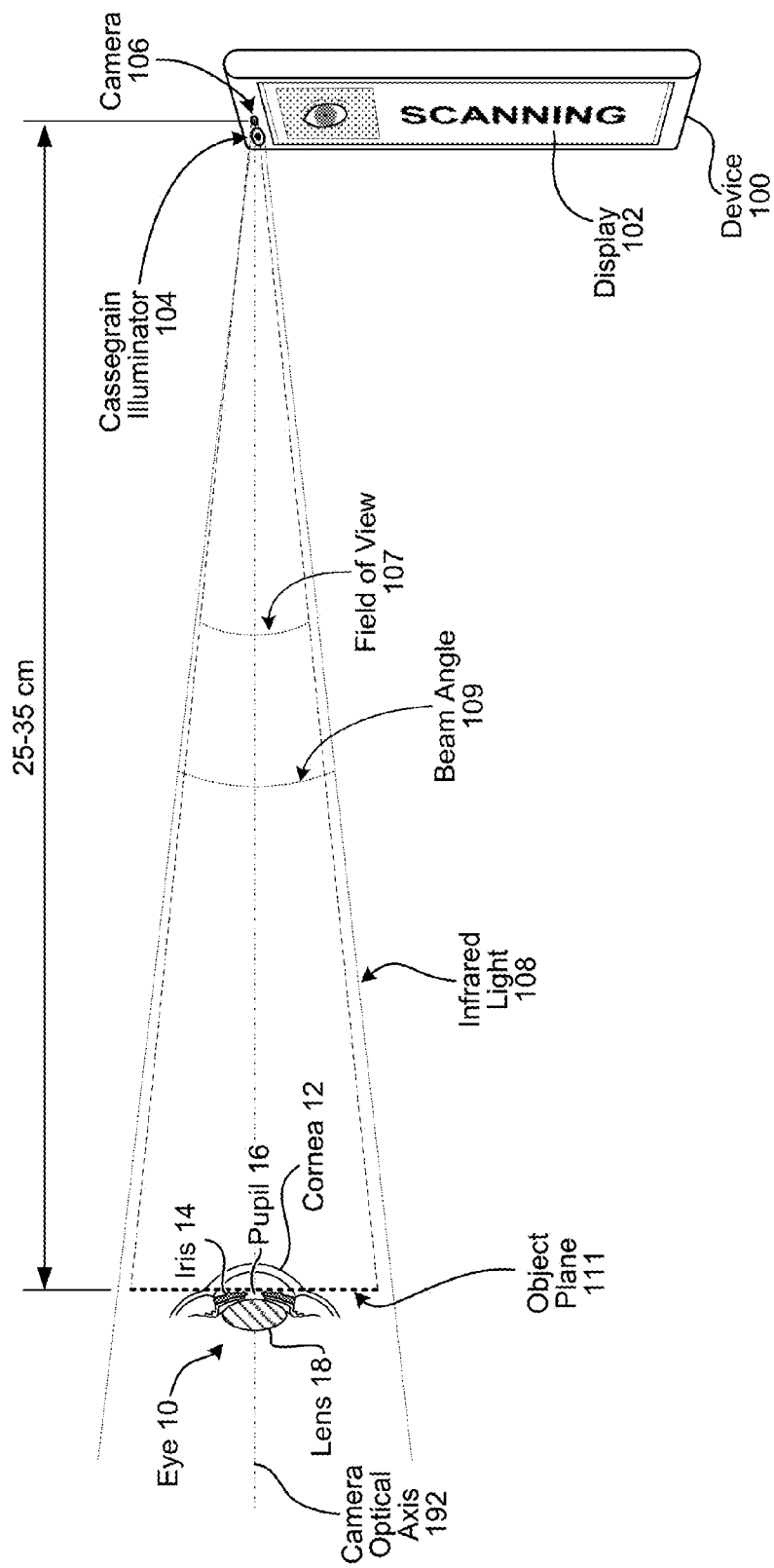
FIG. 1 illustrates an overview of an electronic device that provides integrated iris identification.

FIG. 1 illustrates an electronic device 100 including an illuminator 104 and a camera 106 capable of meeting these requirements. The lens of the camera 106 comprises four molded plastic elements with eight aspheric surfaces at a total thickness of only 3.4 mm (millimeters) that provides a mildly distorted image 1.2 mm across. The relative aperture (also known as the "F-number") is 3.5, with a fixed front focal distance between 25 cm to 35 cm, providing a depth-of-field spanning a fixed focus region of at least 10 cm in depth that is 25 to 35 cm (centimeters) from the eye. The range of the depth of field is based on an arm's length distance that a person scanning their eye is likely to hold the device 100. Although the fixed-focus lens system can precisely focus at one distance at a time, the decrease in sharpness is gradual on each side of the focal distance, so that within the depth of field (DOF), the softened sharpness is imperceptible under normal viewing conditions. The illuminator 104 comprises of a near-IR LED in a reverse Cassegrain telescope configuration for efficient directing of flux toward the eye 10, thereby conserving device volume and electric energy use.

The small size and ability to manufacture both the aspheric lens elements of the camera and the Cassegrain reflector out of injection-molded plastic facilitates inexpensive mass-production of low-cost consumer electronic devices. Moreover, as discussed further below, the four aspheric lens elements of the camera may be made out of the same plastic, such that the four lens elements used for the camera optics may be mass-produced together in a single mold, which is particularly advantageous for just-in-time manufacturing.

Iris recognition is an automated method of biometric identification that uses mathematical pattern-recognition techniques on images of the iris 14 of an individual's eye 10, whose complex random patterns are unique and can be seen from distance. The iris 14 is a thin, circular structure behind the cornea 12 in the eye 10, responsible for controlling the diameter and size of the pupil 16 and thus the amount of light reaching the retina through the lens 18. The color of the iris 14 gives the eye its color. In optical terms, the pupil 16 is the eye's aperture and the iris 14 is the diaphragm that serves as an aperture stop. A human adult typically has an iris with a diameter between 11 mm to 14 mm, with the average being around 12 mm.

Iris recognition may use both visible and near-infrared illumination (near-infrared being the portion of the infrared spectrum closest to the visible spectrum) to acquire images of the detail-rich, intricate structures of the iris externally visible at the front of the eye. Digital templates encoded from these patterns by mathematical and statistical algorithms allow the identification of the individual.

Boundaries of what constitutes the "near-infrared" (NIR) subdivision of infrared vary, with a typical definition being 700 nm to 1400 nm. A NIR range commonly used in iris recognition is 700 nm to 900 nm. The "visible spectrum" or "visible light" refers to the portion of the electromagnetic spectrum that is visible to the human eye. A typical human eye will respond to wavelengths from about 390 nm to 700 nm.

In optical systems, dispersion changes how each optical element bends different colors of light (i.e., the angle of refraction is dependent on wavelength), as seen in the spectrum produced by a dispersive prism and in chromatic aberration of lenses. Conventional cameras are designed to capture a wide range of wavelengths (e.g., the visible spectrum), requiring optics to correct for chromatic aberration across the captured portion of the light spectrum.

In comparison to a conventional camera, the camera 106 of the device 100 is optimized to capture monochromatic light, capturing a narrow distribution of wavelengths in the NIR spectrum, such as +/−10 nm around a center wavelength (i.e., a full-width, half-maximum (FWHM) pass band of 20 nm) or less, and excluding visible wavelengths. The Cassegrain illuminator 104 may be similarly configured, emitting light at approximately the center wavelength captured by the camera, with a FWHM bandwidth of approximately 20 nm. Emissions from the Cassegrain illuminator 104 outside of the range of wavelengths that the camera 106 is sensitive to will not be captured, such that emitting extraneous wavelengths reduces energy efficiency.

As noted above, conventional iris recognition systems may use both visible and NIR light. Even in systems that use only NIR, existing systems typically capture a wide range of wavelength information, such as imaging an iris over the full range of 700 nm to 900 nm. This makes the existing iris recognitions tolerant of different iris colors, which respond differently to the different wavelengths.

By operating in a narrow monochromatic band, wavelength-dependent dispersion is essentially eliminated, such that the camera 106 is able to utilize a compact optical system with a low level of monotonic distortion that is predictable and easily correctable. In comparison, if conventional camera optics were used to capture video of the iris 14, the necessity of accommodating a range of wavelengths while achieving a similar effective focal length and F-stop results in a substantially larger structure than that of camera 106.

However, a trade-off in designing the system to respond to a narrow monochromatic band of infrared light is that the iris recognition algorithm is provided less wavelength information than in a conventional system. The range of monochromatic NIR wavelengths that will work best with dark-colored irises is different than the range that will work best with light-colored irises. Experimental results indicate that using a bandpass filter with a transmissivity peak at 750 nm and a FWHM of approximately 20 nm yields the best results over the widest variety of eye colors (i.e., dark irises to light irises).

In addition to the compact size made possible by operating in a narrow monochromatic band of NIR, another advantage is the camera's lack of sensitivity to filtered wavelengths outside the band. As a result, iris recognition can be performed in bright ambient light (e.g., sunlight) without image blur.

Referring back to FIG. 1, the camera 106 has a narrow field-of-view 107, with the chief ray angle at the image side providing a horizontal field of view 107 of 10 degrees+/−5 degrees (i.e., between five and fifteen degrees). The field of view of the camera is sufficiently narrow so that one millimeter at the iris 14 (at the object plane 111) resolves as at least 8 pixels at the image sensor of the camera. That is to say, the camera 106 should resolve a 1 mm×1 mm area of the iris as at least an 8 pixels×8 pixels in a captured image, as 8 pixels of resolution per mm at the iris is a minimum resolution for providing the level of sharpness and detail needed to reliably perform iris recognition. For an average iris with a diameter of 12 mm, that means the camera should resolve the iris as at least 96 pixels across. At the same time, the field of view 107 should be large enough to allow a user to easily aim the camera 106 at their own eye 10.

The Cassegrain illuminator 104 is configured to illuminate the iris 14 at the object plane within the camera's depth of field. Within the range of 25 to 35 cm of the depth-of-field spanning the fixed focus region of the camera 106, the Cassegrain illuminator 104 produces a cone of infrared light 108 with a beam angle 109 that encompasses the camera's field of view, illuminating the target eye 10. With the illuminator 104 arranged adjacent to the camera 106, the beam angle 109 of the illuminator 104 is larger than the field of view 107 so that the object plane is sufficiently illuminated over the 25 to 35 cm range.

Making the beam angle 109 small so that it is only slightly wider than the field of view 107 improves power efficiency. The minimum beam angle 109 that can be used depends in part on the distance between the optical axis of the camera 192 and the axis of the cone of light produced by the illuminator 104. Whether these axes are parallel or angled relative to each other, proximity of the illuminator 104 to the camera 106 allows for a tighter cone of infrared light 108.

It is also advantageous to have the illuminator 104 and the camera 106 axes in close proximity to keep any glint of the infrared light 108 off the eye 10 on the pupil 16 (ideally, at the center of the pupil), as glint off the iris can reduce iris recognition accuracy. Even so, for an eye with an average iris of 12 mm and an average curvature, the illumination axis may be up to 35 degrees of arc away from the camera axis 192 for an iris positioned 30 cm away from the device 100 before glint will disrupt iris recognition (corresponding to a separation of approximately 25 cm between the illuminator 104 and the camera 106). As such, the illuminator 104 can be arranged separate from the camera 106 (i.e., as a separate device), so long as the separation is not so distant as to produce glint on the iris.

As separation between the illuminator 104 and the camera 106 increases, the minimum beam angle 109 (light cone size) needed to illuminate the camera's target zone also increases, such that more power is necessarily required to illuminate the target zone. The target zone is a volume of space between the object plane 111 at 25 cm and the object plane 111 at 35 cm. The smaller the angle/distance between the center axes of the camera and the illuminator, the closer the beam angle 109 can be to the field of view 107. Power efficiency is optimized by minimizing the separation between these axes, and minimizing the beam angle 109 to produce a narrow beam where the cone of infrared light circumscribes the volume of space that is the target zone. In the example device 100 in FIG. 1, the illuminator 104 and the camera 106 are adjacent to each other, the separation between the axes of the illuminator 104 and the camera 106 having less than 2 degrees of arc.

In general, for efficient operation, the cone of light from illuminator should approximately circumscribe the target zone, accommodating a range that allows for some vignetting in the captured frames (darkening in the corners of the image as a result of the edges cone impinging into the target zone), to a cone of light that is slightly larger than the target zone. A cone that is slightly larger (e.g., 10% wider than required to illuminate the target zone), in addition to illuminating an entirety of the target zone, also accommodates wider manufacturing tolerances.

When the user, the device's operating system or an application executed by the device activates the iris recognition system, a display 102 of the device 100 may provide feedback to assist the user in aligning the optical axis 192 of the camera with the eye. The user looks at the display screen of the device 100 to aim the camera 106 at his/her eye, aligning their iris 14 approximately with a center of an image captured by the camera. Feedback may also be provided to indicate when the device is scanning, and whether an iris is or is not recognized.

Figure 2:
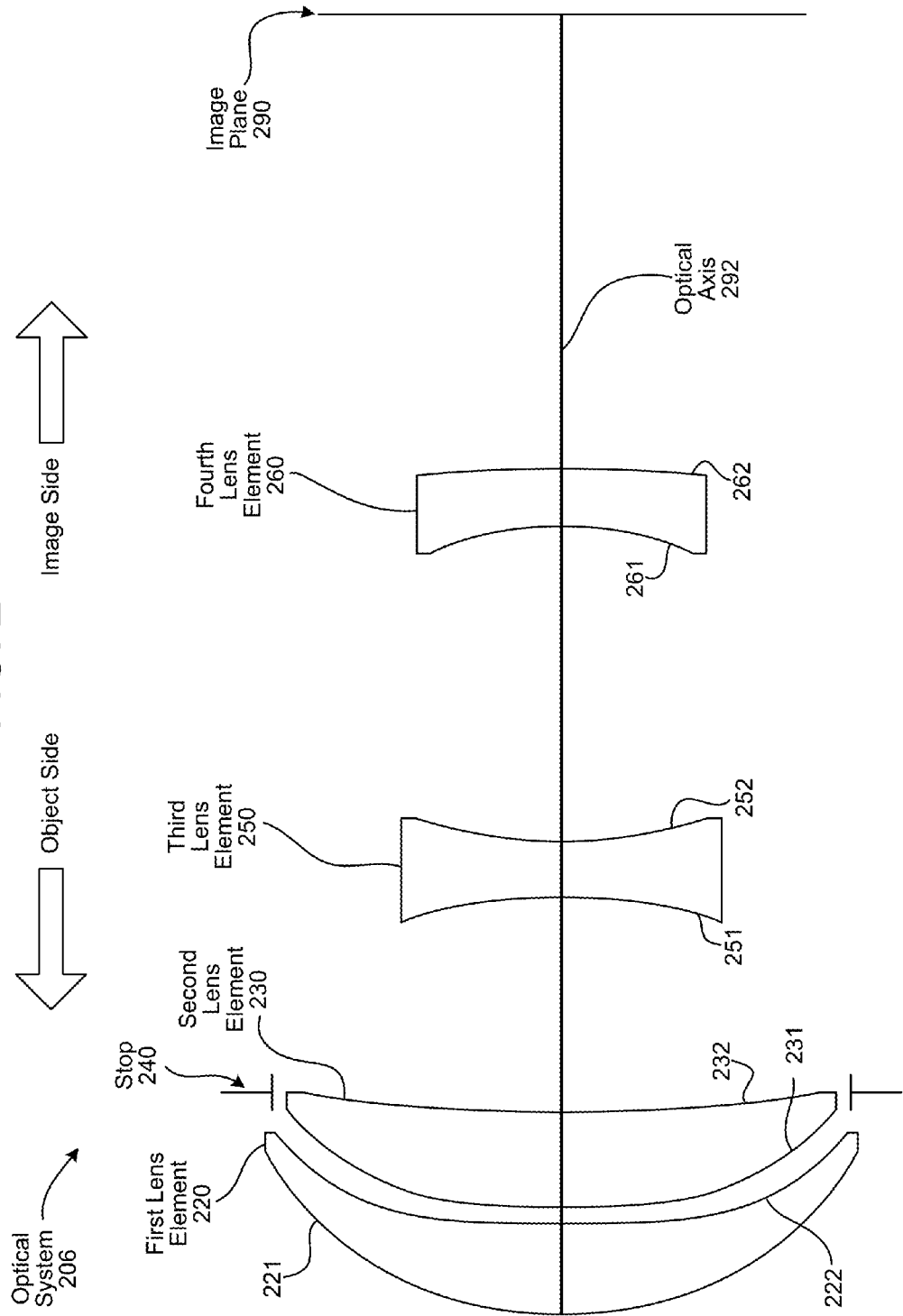
FIG. 2 illustrates a cross-section of a compact optical system used for iris identification.

FIG. 2 shows an optical system 206 including a four-piece lens system. The four-piece lens system comprises, in order from the object side to the image side: a first lens element 220, a second lens element 230, a third lens element 250, and a fourth lens element 260. The design principles of the four-piece lens system are similar to those for a Galilean telescope, in that the first and second lens elements have positive refractive powers (converging incident light) and the third and fourth lens elements have negative refractive powers (diverging incident light).

The first lens element 220 has a positive refractive power and may be made of a "flint" plastic. The first lens element 220 has a convex aspheric object-side surface 221 and a concave aspheric image-side surface 222. Converging lenses have "positive" optical power, while diverging lenses have "negative" power.

Flint glass and flint plastic have a relatively high refractive index and a low Abbe number (high dispersion). The term "flint" is more widely used with glass than with plastic, but refers to the same optical characteristics in each. The Abbe number, also known as the "V-number" of a transparent material, is a measure of the material's dispersion (variation of refractive index with wavelength) in relation to the refractive index, with high values of V indicating low dispersion (low chromatic aberration). In general, although industry definitions somewhat vary, flint glass and plastic can be generally characterized as having an Abbe number of 50 or less, and as having a refractive index between 1.55 and 2.00.

The second lens element 230 has a positive refractive power and may also be made of "flint" plastic. The second lens element 230 has a convex aspheric object-side surface 231 and a concave aspheric image-side surface 232.

The third lens element 250 has a negative refractive power and may also be made of a "flint" plastic. The third lens element 250 has a concave aspheric object-side surface 251 and a concave aspheric image-side surface 252.

The fourth lens element 260 has a negative refractive power and may also be made of "flint" plastic. The fourth lens element 260 has a concave aspheric object-side surface 261 and a convex aspheric image-side surface 262.

The optical system 206 includes an aperture stop 240 proximate to the image side of the second lens element 240 to exclude ambient light incident at the edges of the second lens element 230.

Flint plastic is used for the lens elements in FIG. 2 due to material availability and its relatively high refractive index. However, transparent materials with other optical characteristics may instead be used. The relatively high refractive index of flint plastics contributes the overall compactness of the optical system, which is advantageous. Lower refractive index transparent materials could instead be used, with the trade-off being an increase in the thickness of the optical system.

Since the camera 106 that utilizes the optical system 206 for iris recognition is configured to capture substantially monochromatic near-infrared light, chromatic dispersion is not critical to the design considerations for the optical system 206. As a result, the high level of chromatic dispersion (corresponding to a low Abbe number) associated with flint glass and plastics is not particularly consequential to the optical characteristics of the system 206. In comparison, in a conventional camera, a trade-off of the chromatic dispersion produced by flint glass or plastic is the need for corrective optics to reduce dispersion, thereby increasing the thickness of the camera.

As used herein, "focal length" refers to effective focal length. As known in the art, effective focal length is a value that describes the ability of a lens and/or optical system to focus light, and is the value used to calculate the magnification of a system.

The "beam angle" refers to the angle across the cone of infrared light 108 produced by direct illumination of the object plane 111 by the illuminator 104 that has an intensity of at least 50% of the maximum intensity of the infrared light 108 at the object plane 111. Softer "indirect" illumination infrared light may illuminate an area around a periphery of the cone (outside the beam angle) as a result of (among other things) the air and surfaces/imperfections within the illuminator diffusing the near-infrared light.

The aspheric surfaces of the four lens elements have a more complex profile than a spherical curve. An aspheric surface can have a wide variety of forms. The aspheric surface of the optical system 206 are expressed in accordance with equation [1] as follows:

$$z(r) = \frac{r^2}{R\left(1 + \sqrt{1 - (1+\kappa)\frac{r^2}{R^2}}\right)} + \alpha_2 r^2 + \alpha_4 r^4 + \alpha_6 r^6 + \ldots \quad [1]$$

where the optical axis is presumed to lie in the "z" direction along the optical axis 192/292, and z(r) is the "sag" of the surface. The sag of the surface is the z-component of the displacement of the surface from the vertex at distance "r" from the optical axis 192/292. The aspheric coefficients $\alpha_i$ describe the deviation of the surface from the axially symmetric quadric surface specified by the radius of curvature R and the conic constant $\kappa$, where $\alpha_2$ is the second order aspheric coefficient, $\alpha_4$ is the fourth order aspheric coefficient, $\alpha_6$ is the sixth order aspheric coefficient, and so on.

Figure 3:
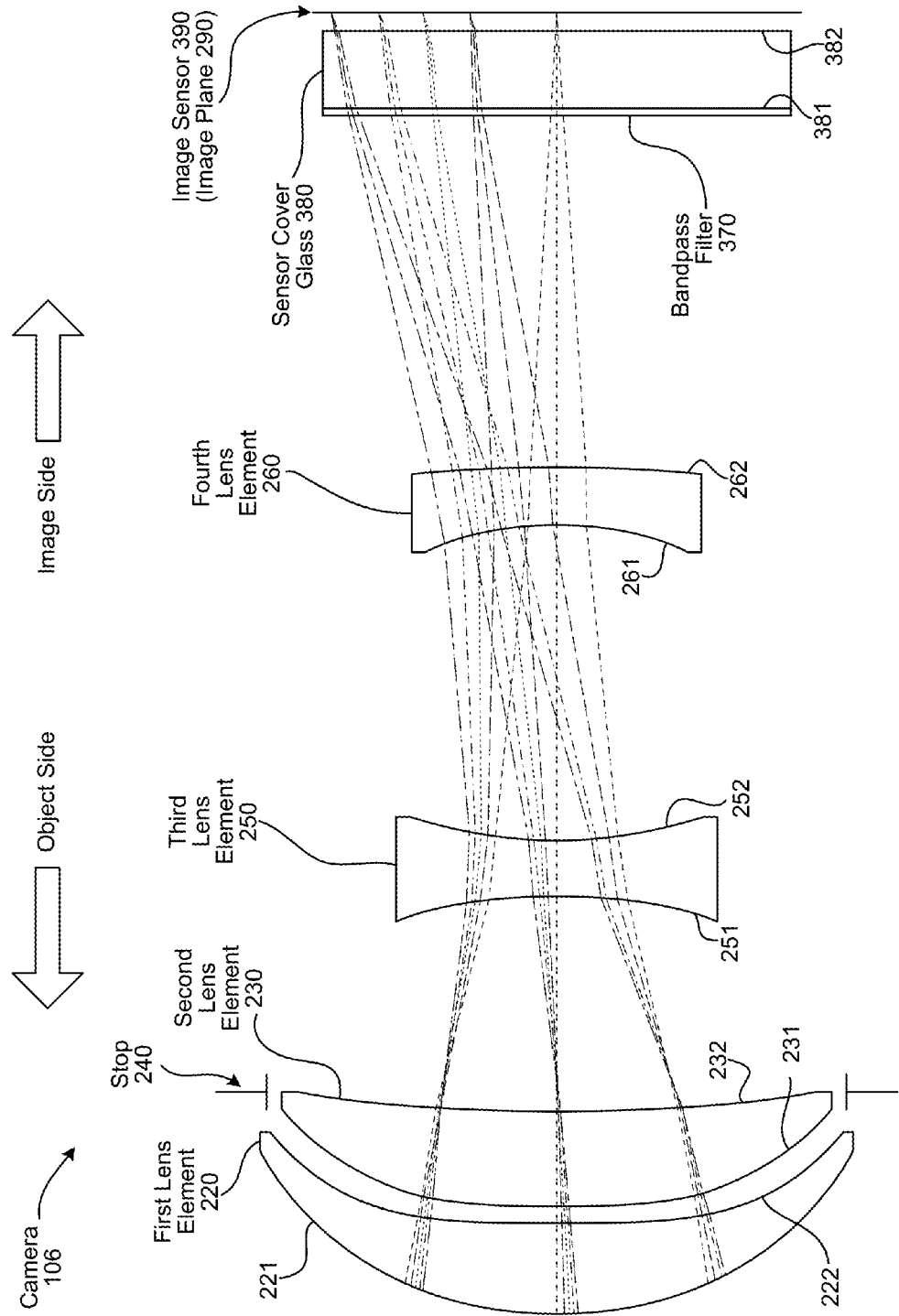
FIG. 3 illustrates the path of light rays through a camera including the compact optical system of FIG. 2.
Figure 4:
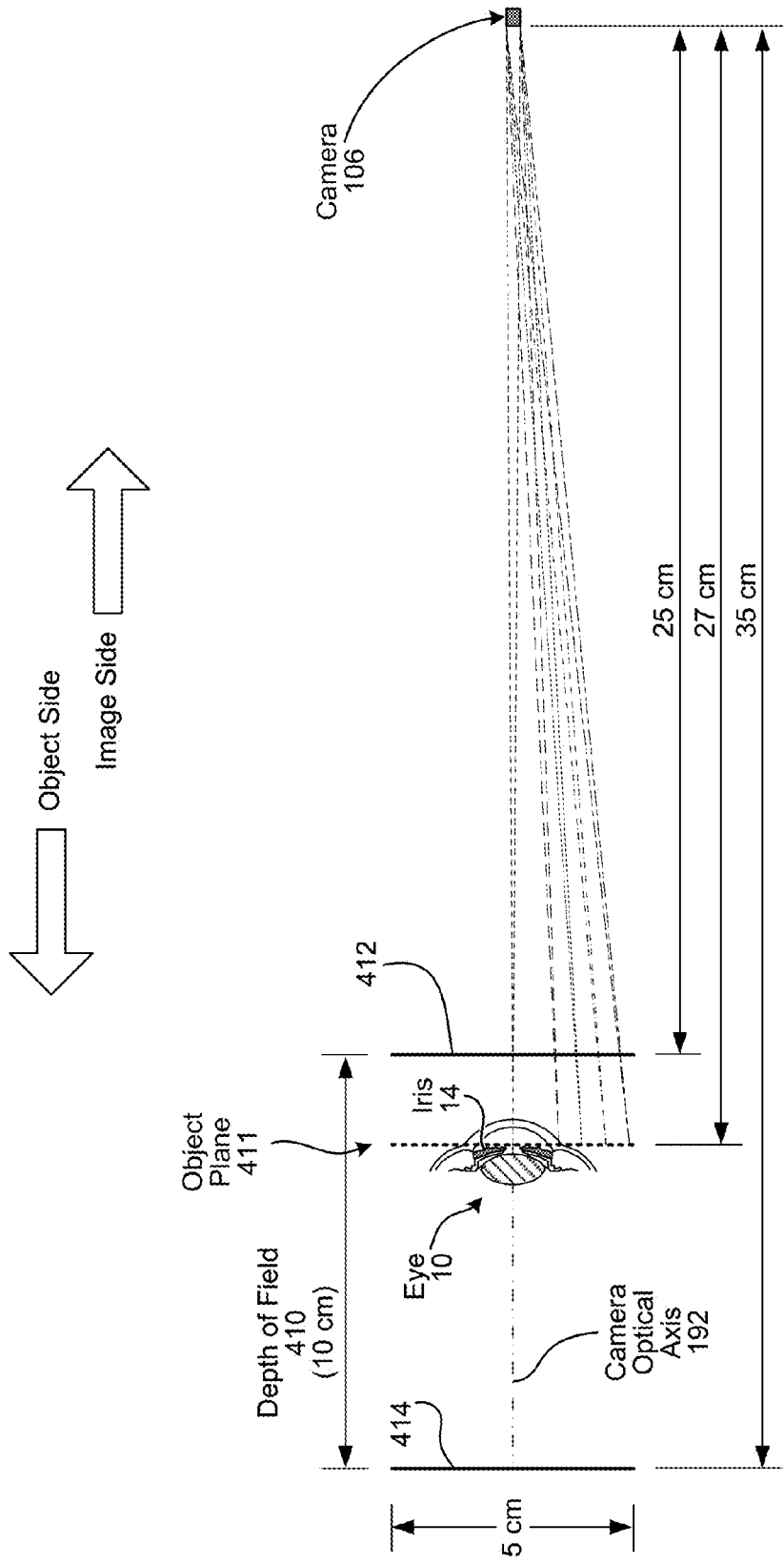
FIG. 4 illustrates the path of the light rays from an eye to the camera.

FIGS. 3 and 4 illustrate a plurality of ray traces from an object plane 411 through a camera 106 that includes an example embodiment of the optical system 206, and also includes an image sensor 390 arranged at the image plane 290, a cover glass 380 over the sensor, and bandpass filter 370. The cover glass 380 is located between the image-side surface 262 of the fourth lens element 260 and the image plane 290. The total axial length along the optical axis 192 from the object (i.e., eye 10) to the image plane 290 is 273.41 mm. The total axial length along the optical axis 192 from the object-side surface 221 of the first lens element 220 to the image plane 290 is 3.41 mm.

The bandpass filter 370 comprises one or more optical coatings, and only allows wavelengths in a narrow band to pass through (e.g., transmissivity at 750 nm+/−10 nm). Other wavelengths, including ambient light in the visible spectrum, are excluded. The bandpass filter 370 is of negligible thickness (in terms of the overall dimensions of the optical system 206) and has negligible impact on the refraction of incident light. Although illustrated on the object-side surface 381 of the sensor glass 380, the bandpass filter 370 may be arranged on any surface traversed by the optical axis 192/292 within the camera 106. In addition, the bandpass filter 370 may be distributed over multiple surfaces, such as providing a first coating on a first surface that acts as a low-pass filter (e.g., selectively passing near-infrared and infrared wavelengths, but blocking visible wavelengths), and a second coating on a second surface that acts as a high-pass filter (e.g., selectively passing near-infrared and visible wavelengths, but blocking infrared). Some wavelengths may also be filtered by the material(s) used to form the lens elements.

Figure 5:
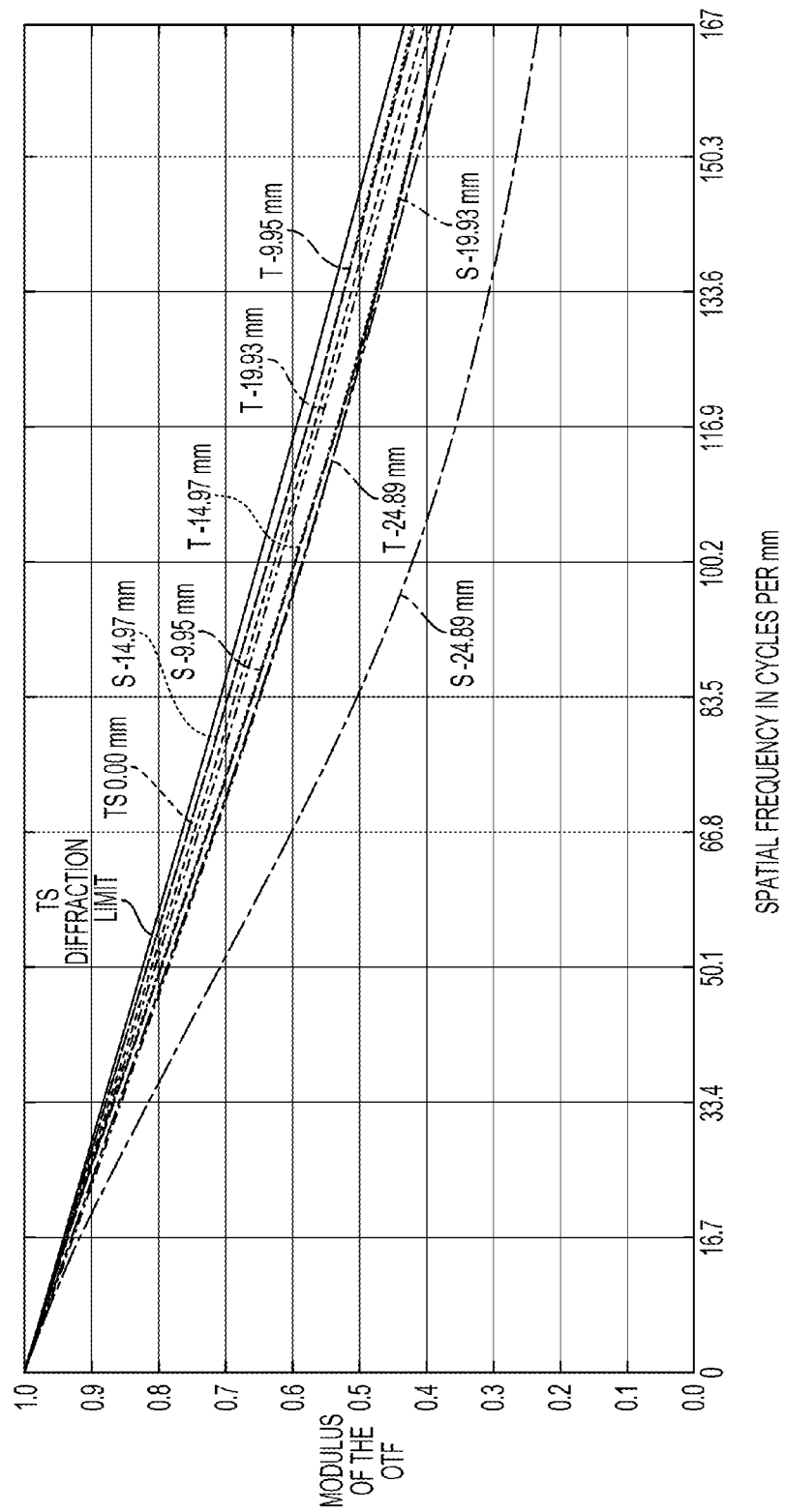
FIG. 5 illustrates a diffraction modulation transfer function (MTF) for an example embodiment of the camera capturing near-infrared light at 750 nm (nanometers).

FIG. 5 illustrates a diffraction modulation transfer function (MTF) for the example embodiment of the optical system 206 arranged in the camera 106 of FIG. 3. The line patterns used for the ray traces in FIGS. 3 and 4 corresponds to the line patterns used in the MTF plots in FIG. 5. The MTF plots follow the "S" sagittal (radial) and "T" tangential direction data at various distances along the object plane 411, for monochromatic light with a wavelength of 750 nm, measured perpendicular to the optical axis 192/292. The horizontal axis is the spatial frequency in cycles per millimeter, and the vertical axis is the absolute value of the modulus of the optical transfer function (OTF).

The MTF curves exhibit a sharp image for an image sensor 390 that is 1.2 mm across with three micron pixels arranged in a 400-by-400 grid. The Nyquist frequency for the 3.0 micron pixels of the image sensor 390 is 83.5 cycles/mm. The object area is approximately 50 mm at object plane 111 (where the iris 14 of the user's eye 10 is located). As demonstrated by the "S" sagittal (radial) trace at a radius of 24.89 mm, the modulation transfer function (MTF) fails in the corners of the captured image, characteristic of "vignetting." However, as a circular image field on the image sensor is all that is required for iris recognition (centering the eye), the vignetting at the corners is of no consequence.

Figure 6:
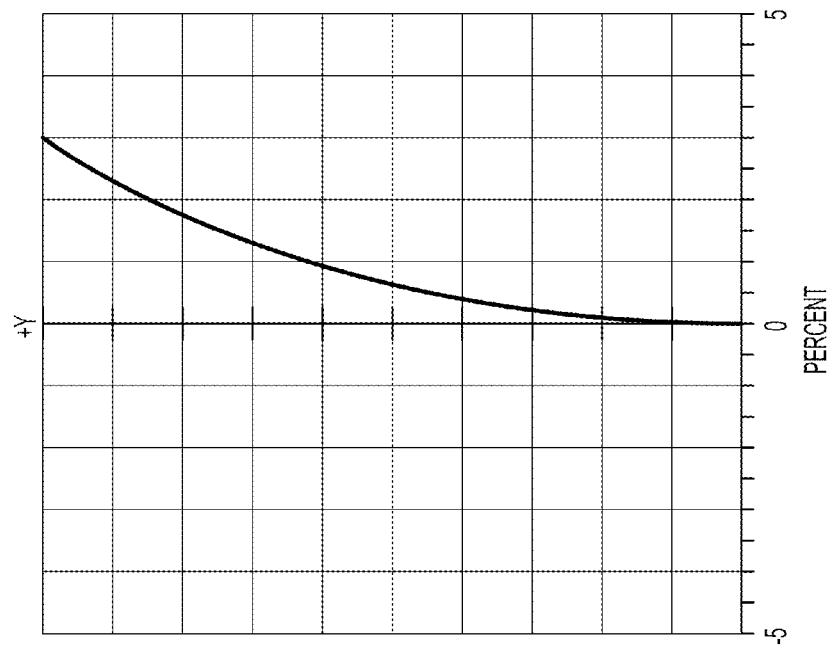
FIG. 6 illustrates a field curvature curve for the embodiment of the camera capturing near-infrared light at 750 nm.
Figure 7:
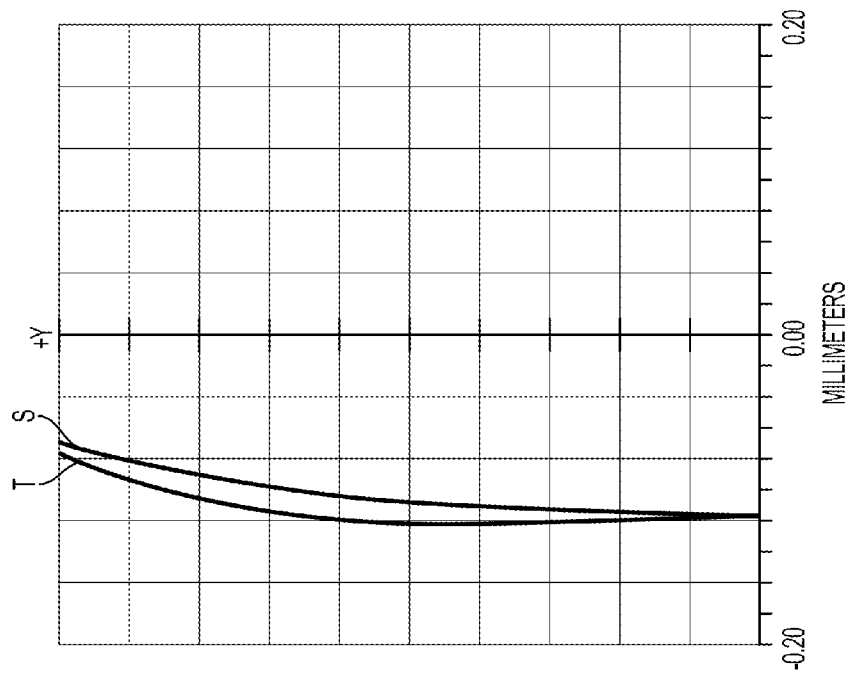
FIG. 7 illustrates a distortion curve for the example embodiment of the camera capturing near-infrared light at 750 nm.

FIG. 6 illustrates field curvature curves and FIG. 7 illustrates a distortion curve at the example embodiment of the optical system 206. The maximum field is 24.890 millimeters and the wavelength is 750 nm. Distortion is monotonic and under 3%. An advantage of such predictable distortion is that it is easy to correct after an image is captured using conventional image processing techniques.

As noted above, in order to provide the requisite sharpness for iris recognition, the optical system needs to provide at least 8 pixels of resolution at the image sensor 390 per millimeter of the iris 14. Achieving this requisite level of sharpness depends in part on the field of view. The field of view of the optical system is a function of the size of the image sensor 390 at the image plane 290 and the effective focal length of the optical lens system is "f." Therefore, achieving the field of view of 10 degrees+/−5 degrees depends upon the effective focal length of the optical system, and the size and pixel density of the image sensor.

The F-number "FNO" of the optical system is the ratio of the optical system's focal length to the diameter of the aperture of its stop. The F-number of the optical system 206 needs to provide a fixed focus depth with a sufficient depth-of-field for imaging the iris at an arm's length. Depth of field increases with F-number, and is also dependent upon focal length. For a fixed focal length, as the F-number is decreased, the depth-of-field decreases to become more shallow, reducing the range in which an object appear to have sharp features. As the F-number is increased, resolution sharpness of a captured image is reduced.

In the example embodiment of the four-lens system 206 included in the camera 106 in FIG. 3, the effective focal length "f" of the optical lens system satisfies:

f=5.4 mm and the F-number "FNO," which is the ratio of the optical system's focal length to the diameter of the aperture of the stop 240, satisfies:

FNO=3.5 and the horizontal field of view "2ω" satisfies:

2ω=9.7°.

The detailed optical data of the example embodiment in FIG. 3 is shown in Table 1, and the aspheric surface data is shown in Table 2. The refractive index is "nd" and the Abbe number is "vd." The refractive indexes are relative to the wavelength of the helium "d" line (587.56 nm). All units are in millimeters.

TABLE 1

| Surface | Type | Curvature Radius | Thickness | Material | nd | vd |
|---|---|---|---|---|---|---|
| 411 | Object | ∞ | 270.000 | | | |
| 221 | Lens 1 | 0.9757 (ASP) | 0.222 | Plastic (EP5000) | 1.634 | 23.8447 |
| 222 | | 1.8831 (ASP) | 0.050 | | | |
| 231 | Lens 2 | 0.8495 (ASP) | 0.222 | Plastic (EP5000) | 1.634 | 23.8447 |
| 232 | | 1.8269 (ASP) | 0.064 | | | |
| 240 | Stop | | 0.518 | | | |
| 251 | Lens 3 | 1.1608 (ASP) | 0.144 | Plastic (EP5000) | 1.634 | 23.8447 |
| 252 | | 1.2140 (ASP) | 0.825 | | | |
| 261 | Lens 4 | 1.6704 (ASP) | 0.150 | Plastic (EP5000) | 1.634 | 23.8447 |
| 262 | | −0.6263 (ASP) | 0.960 | | | |
| 381 | Cover | ∞ | 0.200 | Glass | 1.52 | 64.2 |
| 382 | | ∞ | 0.052 | | | |
| 390 | Image | ∞ | 0.000 | | | |

TABLE 2

| Surface | Type | Semi-Diameter | Conic κ | $\alpha_2$ | $\alpha_4$ | $\alpha_6$ |
|---|---|---|---|---|---|---|
| 411 | Object | 24.890 | 0 | 0.0000 | 0.0000 | 0.0000 |
| 221 | Lens 1 | 0.776 | 0 | −0.0271 | −0.1090 | 0.4294 |
| 222 | | 0.752 | 0 | −0.2719 | 0.7615 | −0.0159 |
| 231 | Lens 2 | 0.723 | 0 | −0.5133 | 0.7584 | −0.7357 |
| 232 | | 0.691 | 0 | −0.1667 | 0.0199 | 0.0375 |
| 240 | Stop | 0.725 | 0 | 0.0000 | 0.0000 | 0.0000 |
| 251 | Lens 3 | 0.423 | 0 | −0.6287 | −0.1679 | −2.3050 |
| 252 | | 0.385 | 0 | −0.0198 | 0.4489 | −2.6605 |
| 261 | Lens 4 | 0.338 | 0 | −0.6932 | −1.2881 | −2.0025 |
| 262 | | 0.368 | 0 | 0.8303 | −0.5105 | 1.8387 |
| 381 | Cover | 0.558 | 0 | 0.0000 | 0.0000 | 0.0000 |
| 382 | | 0.615 | 0 | 0.0000 | 0.0000 | 0.0000 |
| 390 | Image | 0.639 | 0 | 0.0000 | 0.0000 | 0.0000 |

Thicknesses in Table 1 are measured from one surface to the next, from the object side to the image side, relative to the structure as illustrated in FIGS. 3 and 4, along the optical axis 192. For example, the first lens element 220 has a curvature radius of 0.9757 mm on its aspheric object-side surface 221, a curvature radius of 1.8831 on its aspheric image-side surface 222, a thickness of 0.222 millimeters, and is made of plastic EP5000 (referring to the transparent plastic's commercial designation).

The semi-diameters in Table 2 are one-half of the diameter of a respective curved surface. The term "semi-diameter" is used instead of "radius" to distinguish the value from the radius of curvature. For each lens element, the semi-diameter is measured from the optical axis 192 to the edge of the continuous curve, the edge of the continuous curve either being a flat portion of the element (e.g., surface 222, surface 252) or the element's outer edge (e.g., surface 221, surface 231).

Figure 8:
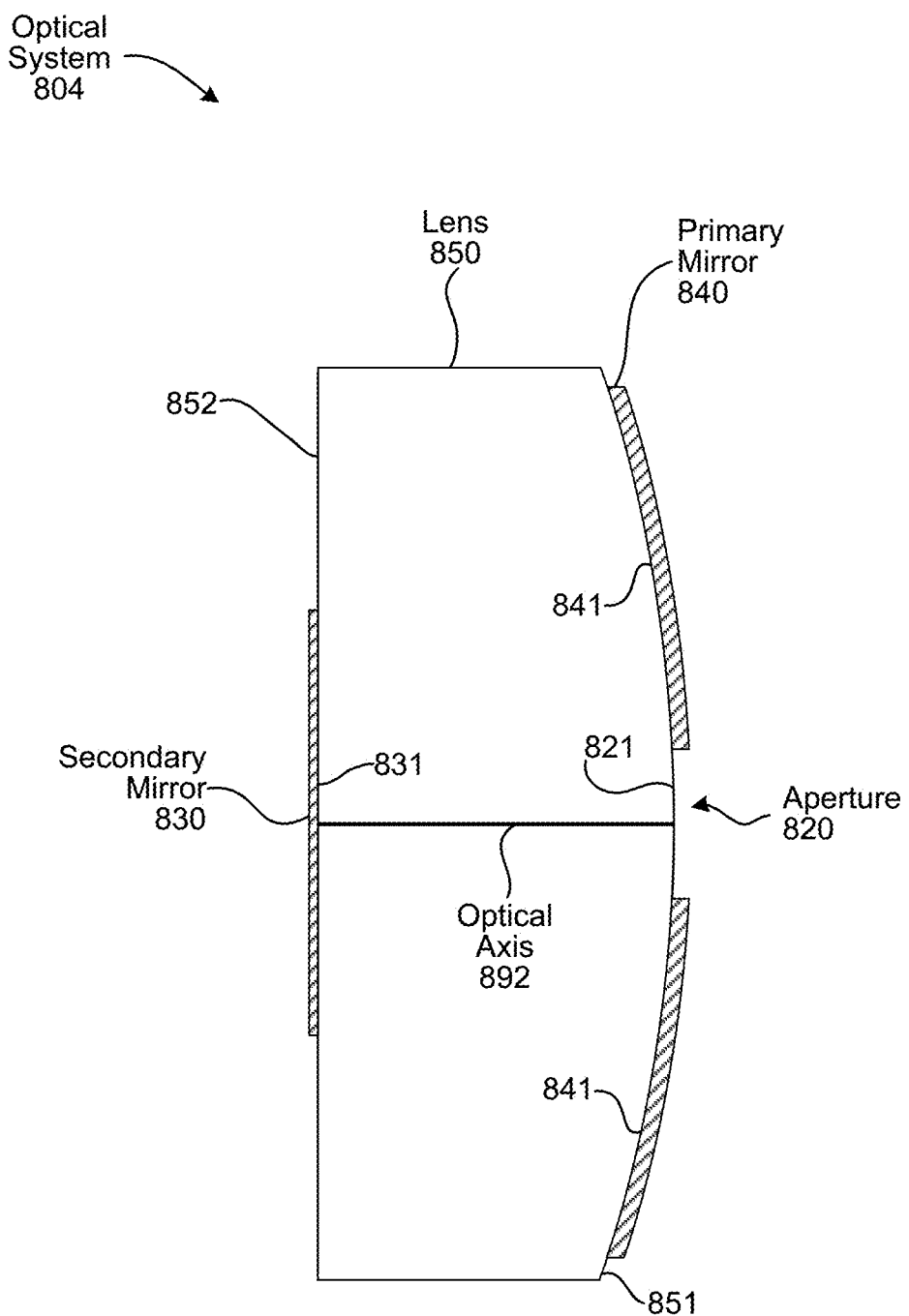
FIG. 8 illustrates a cross-section of a Cassegrain reflector.

FIG. 8 illustrates an optical system 804 that serves as the Cassegrain reflector of the Cassegrain illuminator 104. The optical system 804 comprises a lens 850 that is selectively coated on opposite side 851 and 852 with mirror coatings 830 and 840 so that light entering an aperture 820 though the primary mirror 840 is reflected to be emitted from surface 852. The optical system 804 could also be used as to form a Cassegrain telescope, where light incident at surface 852 is gathered and focused out the aperture 820. "Primary" mirror and "secondary" mirror is conventional nomenclature commonly used with Cassegrain telescopes. An advantage of this solid single-lens 850 Cassegrain reflector arrangement is that there is no need to calibrate the mirrors 830 and 840 relative to each other during assembly, and the compact nature afforded by the refraction provided by the lens 850 (in comparison to a Cassegrain reflector that uses mirrors alone). The Cassegrain design also removes the need for thick LED lens to gather and direct the infrared light.

As illustrated, surface 851 is convex and surface 852 is flat. However, as is known in Cassegrain reflector telescopes, the surface 831 of the secondary mirror may be hyperbolic. A hyperbolic surface gathers light from a wider area, which is advantageous in a telescope for collecting more light using a primary mirror having a wider parabolic surface. Although the design considerations for the illuminator 104 are different than those for a telescope, a hyperbolic secondary mirror may be used with the illuminator 104 as well, in which case the surface 852 of the lens 850 may be concave. One reason to a hyperbolic secondary mirror may be used is to decrease the thickness of the lens 850 and/or decrease the semi-diameter of the lens 850. However, a flat secondary mirror is advantageous in view of the distance to the object (25 cm to 35 cm), such that the secondary mirror 830 and the corresponding surface 852 of the lens 850 is flat or approximately flat (such that the mirror surf ace 831 may be flat or slightly hyperbolic).

Figure 9A:
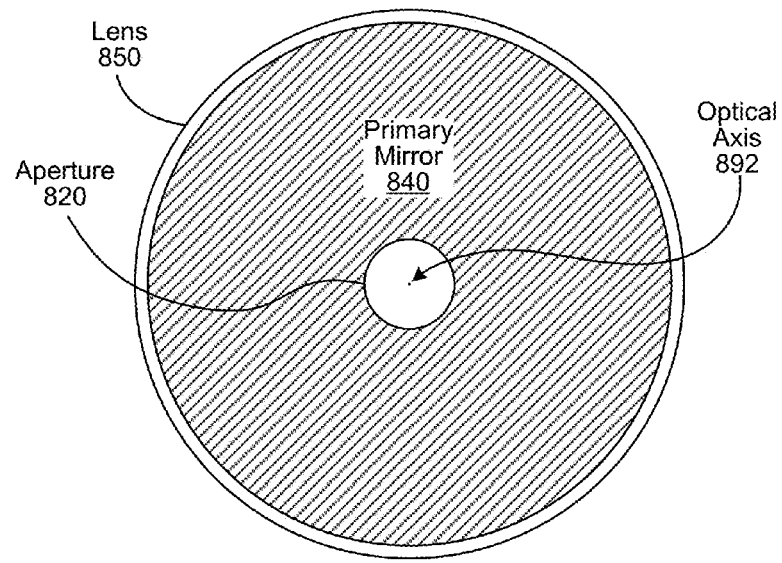
FIGS. 9A and 9B illustrate opposite sides of the Cassegrain reflector.
Figure 9B:
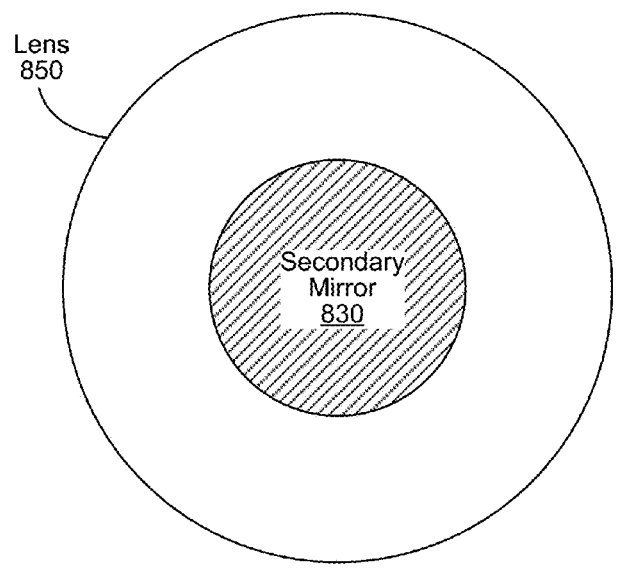

FIG. 9A illustrates a view of the optical system 804 as viewed from the aperture side, including the back of the annulus-shaped primary mirror 840, with the aperture 820 through a center of the annulus, and FIG. 9B illustrates a view of the optical system 804 as viewed from the opposite side including the back of the secondary mirror 830.

Figure 10:
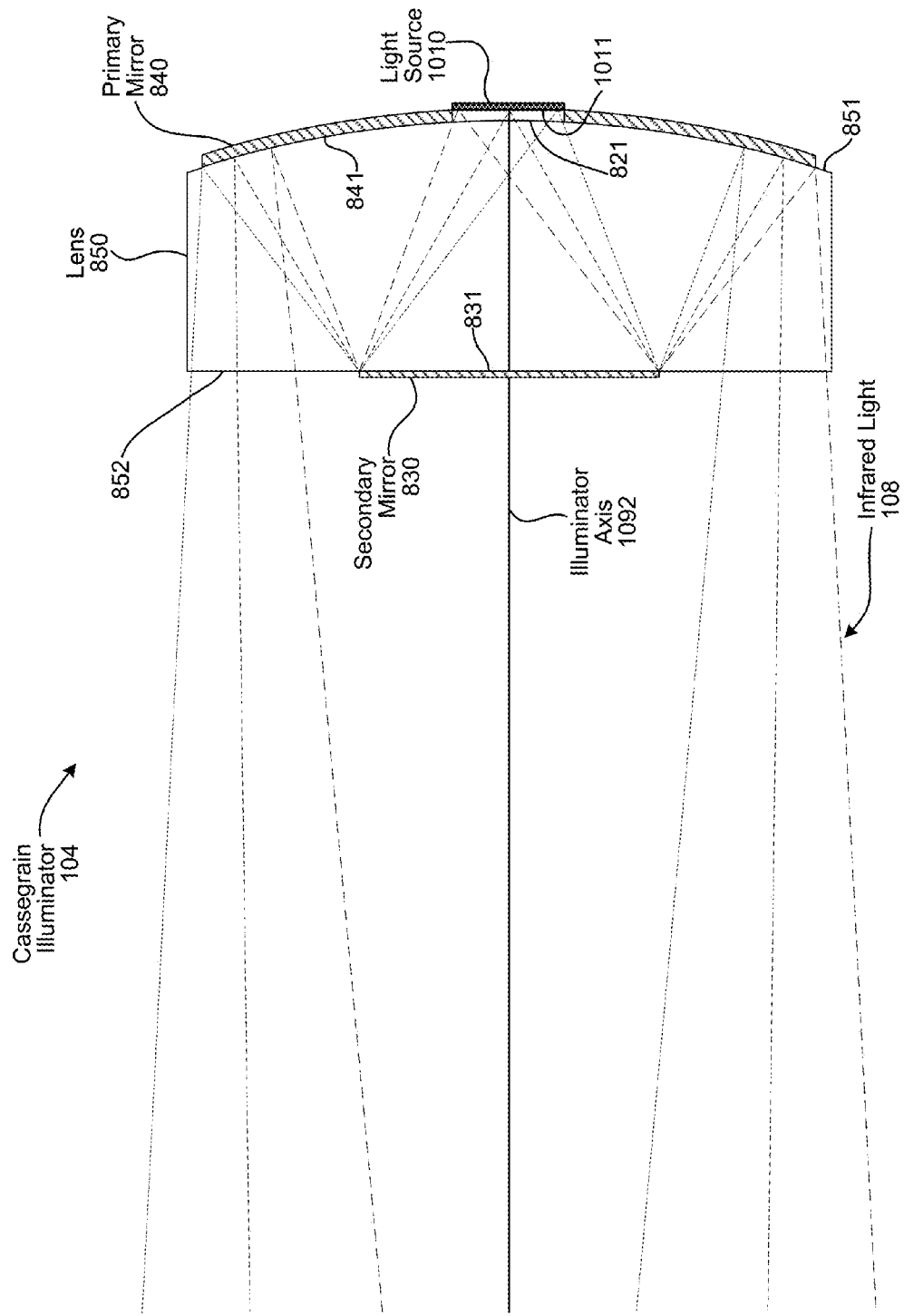
FIG. 10 illustrates the path of light rays though an illuminator including the Cassegrain reflector of FIG. 8.
Figure 11:
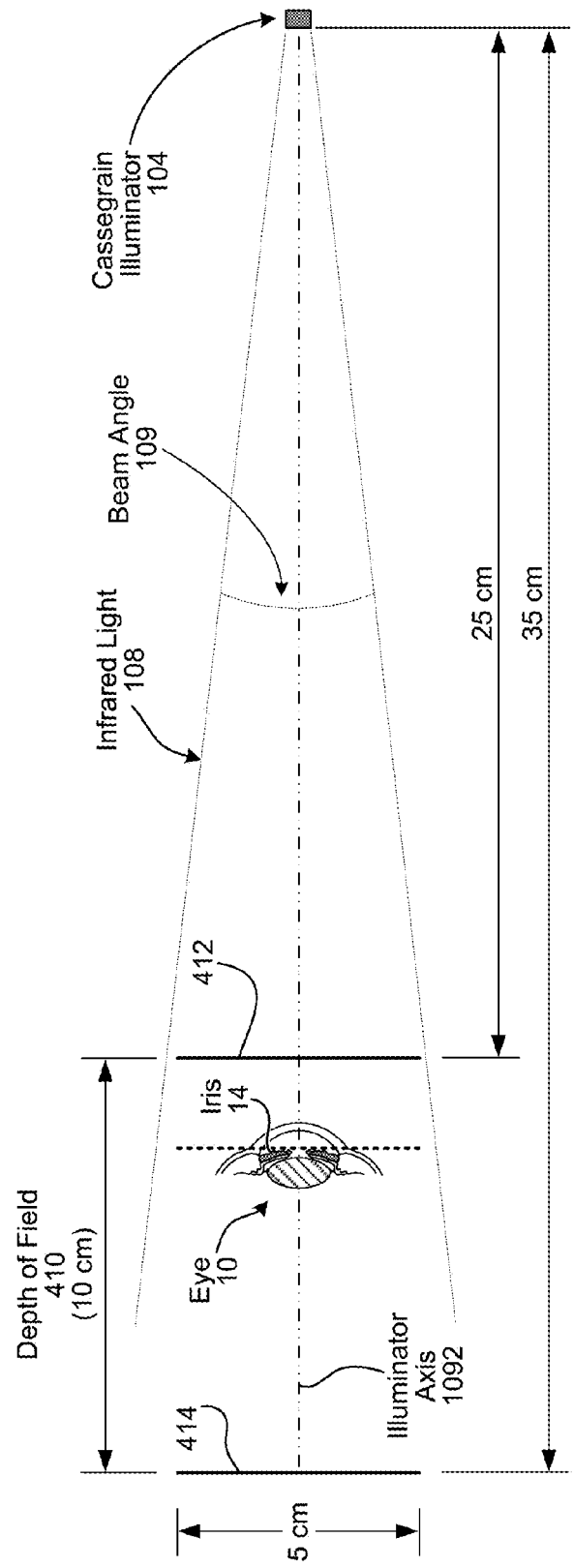
FIG. 11 illustrates the path of light rays from the illuminator to an eye.

FIG. 10 illustrates an embodiment of the optical system 804 arranged as the Cassegrain illuminator 104. FIG. 11 illustrates the cone of infrared light 108 emitted by the illuminator 104 relative to the depth of field 410 of the camera 106 that is paired with the illuminator 104. A substantially monochromatic NIR light source 1010 emits light from surface 1011 into the aperture 820. The light source may be, for example, a light emitting diode (LED) or an array of LEDs. The light rays of infrared light 108 illustrated in FIG. 10 are drawn with different dash patterns to make the lines easier to follow, but each of the light rays comprises a same wavelength or same narrow range of wavelengths.

The light 108 from the light source 1010 enters the lens 850 at a surface 821. Surface 821 is the part of surface 851 coincident with the aperture 820 through the primary mirror 840. The light 108 then reflects off secondary mirror 830 at mirror surface 831 to be redirected toward the primary mirror 840. Surface 841 of the primary mirror 840 then reflects the light out of the lens 850 through the surface 852 of the lens 850 around the periphery of the secondary mirror 830.

The detailed optical data of the example embodiment in FIG. 10 is shown in Table 3. The refractive index is "nd" and the Abbe number is "vd." The refractive indexes are relative to the wavelength of the helium "d" line (587.56 nm). All units are in millimeters.

TABLE 3

| Surface | Type | Curvature Radius | Thickness | Material | Semi-Diameter | Conic κ |
|---|---|---|---|---|---|---|
| 411 | Source | | 3.000 | PC2 | | 0.5 |
| 831 | Lens | | −2.900 | Mirror | | 1.874 |
| 841 | | 11.898 | 2.900 | Mirror | 5.949 | 3.023 |
| 852 | | | 250 | | | 3.108 |
| 412 | Object | | 0 | | | 30.619 |

The lens 850 is made of flint plastic, which in the example embodiment is a polycarbonate known by the commercial designation of PC2. PC2 has an index of refraction of 1.591, and an Abbe number in the range of 30 to 33.5 (depending upon manufacturer). As noted above, the relatively low Abbe number and corresponding high level of chromatic dispersion is of little consequence due to the substantially monochromatic operation of the system. Any mirror coating may be used for mirrors 830 and 840, so long as it is highly reflective (e.g., >98%) of the wavelength(s) of the infrared light 108.

Thicknesses/distances are relative to the optical axis 892/illuminator axis 1092 from one surface to the next, from the light source 1010 to the near boundary 412 of the depth of field 410 of the camera 106. The negative thickness indicates that light 108 is travelling in the opposite direction (back toward the surface of the lens 850 coupled to the light source 1010. For example, along the axis 892/1092, the lens is 2.900 mm thick. There is a distance of 0.100 mm between the front surface 1011 of the light source and the surface 821 of the lens 850. The semi-diameter of the aperture 820 is 0.5 mm. The semi-diameter of the mirror 830 is 1.874 mm. The semi-diameter (as measured from the axis) of the primary mirror 840 is 3.023 mm, whereas the semi-diameter of surface 852 of the lens 850 is 3.108 mm. The near boundary 412 of the depth of field 410 is 250 mm away from the surface 852, and at that distance, the semi-diameter of the cone of emitted infrared light is 30.619 mm. This illumination cone complements the field-of-view of the camera, with the area of illumination being wider than the camera's field of view, but with most of the emitted light being incident within the area being imaged. The relative illumination at the near boundary 412 of the depth of field 410 is better than 85%.

Figure 12:
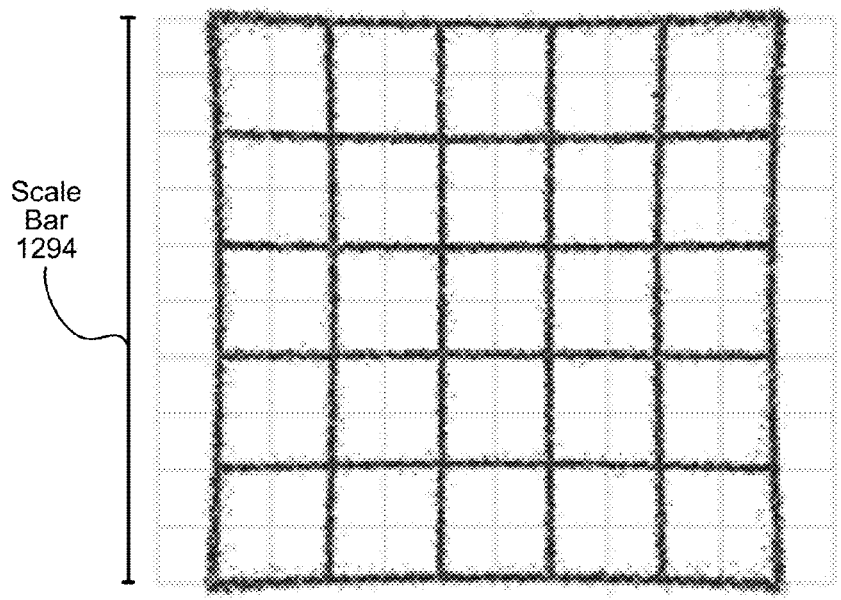
FIG. 12 is a distortion grid characteristic for the example embodiment of the camera capturing near-infrared light at 780 nm.

FIG. 12 is a distortion grid characteristic of the optical system 206 of the example embodiment of the camera 106, as characterized above in Tables 1 and 2. FIG. 12 is drawn to scale, with a scale bar 1294 having a length of 1.20 millimeters (corresponding to the size of the image sensor 390). The field position is 0.00 millimeters. The four-lens optical system exhibits mild pincushion distortion, but as it is monotonic and under 3%, it is easy to correct for using known image processing techniques. Based on simulation modelling, the overall optical efficiency of the camera 106 including the optical system 206 is better than 97%.

Figure 13:
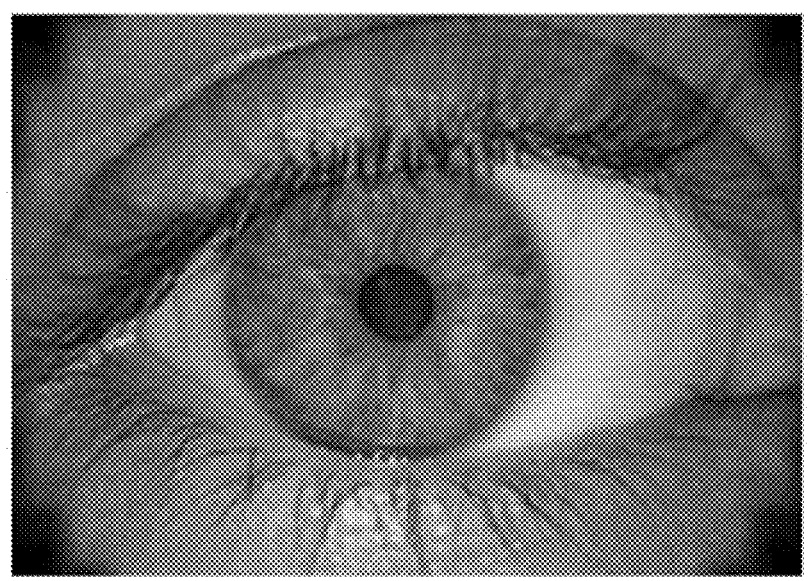
FIG. 13 is an example image that simulates the geometric aberrations of the optical system of FIGS. 2 and 3.

FIG. 13 is an example that simulates the geometric aberrations of an image of the eye 10 positioned at the at the object plane 111 that is 27 cm (centimeters) from the object-side surface 221 of the first lens element 220 (relative to the optical axis 192). In the simulated image, consistent with the distortion illustrated in FIG. 12, the device 100 captures an image at the object plane 111 that spans an object height of 35 mm and the object width of approximately 50 mm. At the image plane 290, the image height is 0.8113 mm and the image width is 1.1442 mm, providing a magnification ratio of approximately 1:43. The darkening in the corners is the result of vignetting produced by the optical system 206.

As discussed above, the depth of field for the camera 106 is approximately 25 cm to 35 cm. This range was selected based on the distance a person is likely to hold a device from their eye when performing biometric authentication based on iris recognition. Also, while NIR wavelengths in the range of 700 to 950 nm can be used for iris recognition, for a substantially monochromatic system, experimental results indicate that 750 nm yields the best results over the widest variety of eye colors (i.e., dark irises to light irises). Longer wavelengths work well with dark-colored irises, but recognition accuracy for light irises declines as the illumination wavelength increases.

Figure 14:
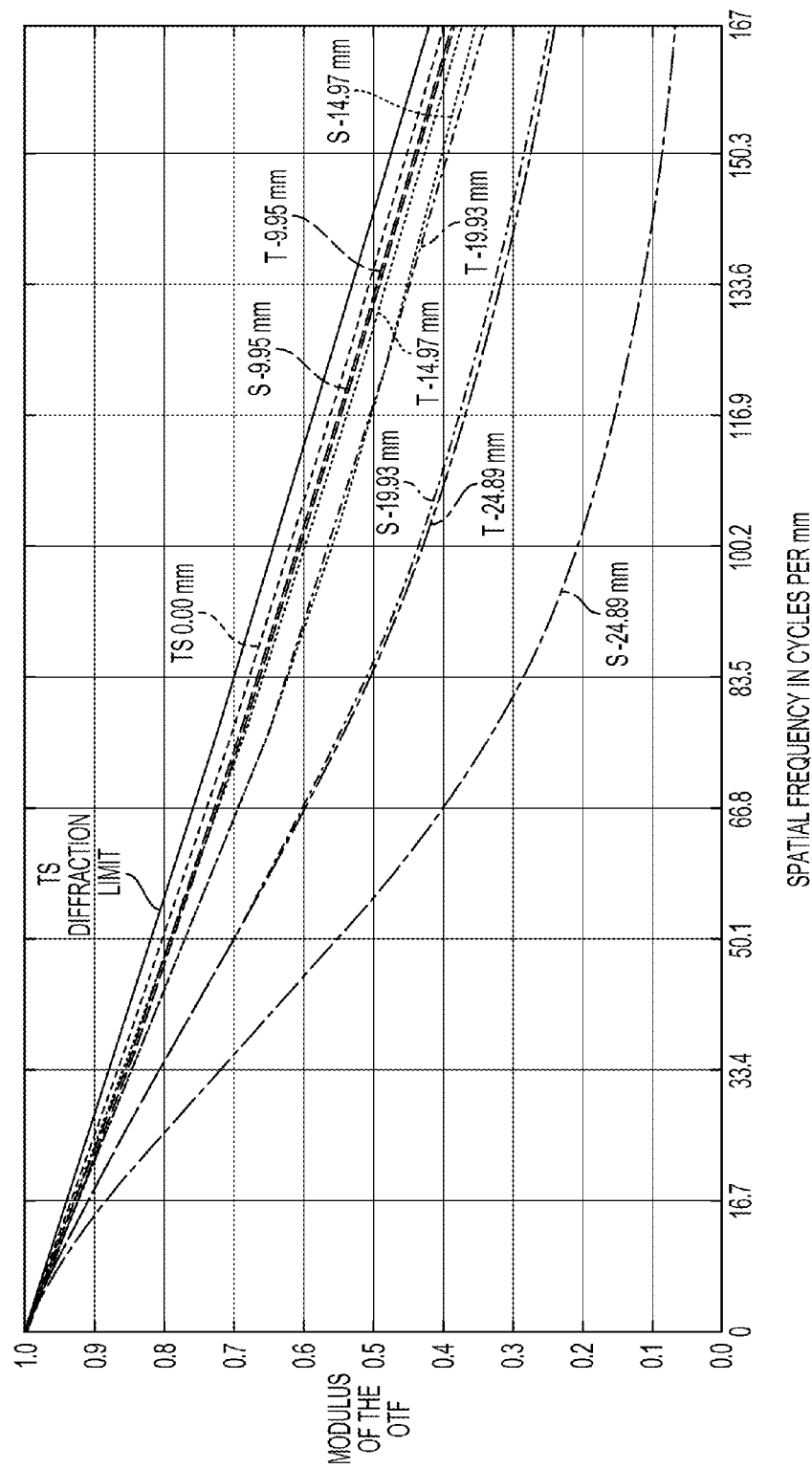
FIGS. 14, 15, and 16 illustrate diffraction MTFs at the front, middle, and back of the depth of field of the camera if capturing near-infrared light at 766 nm to 794 nm.
Figure 15:
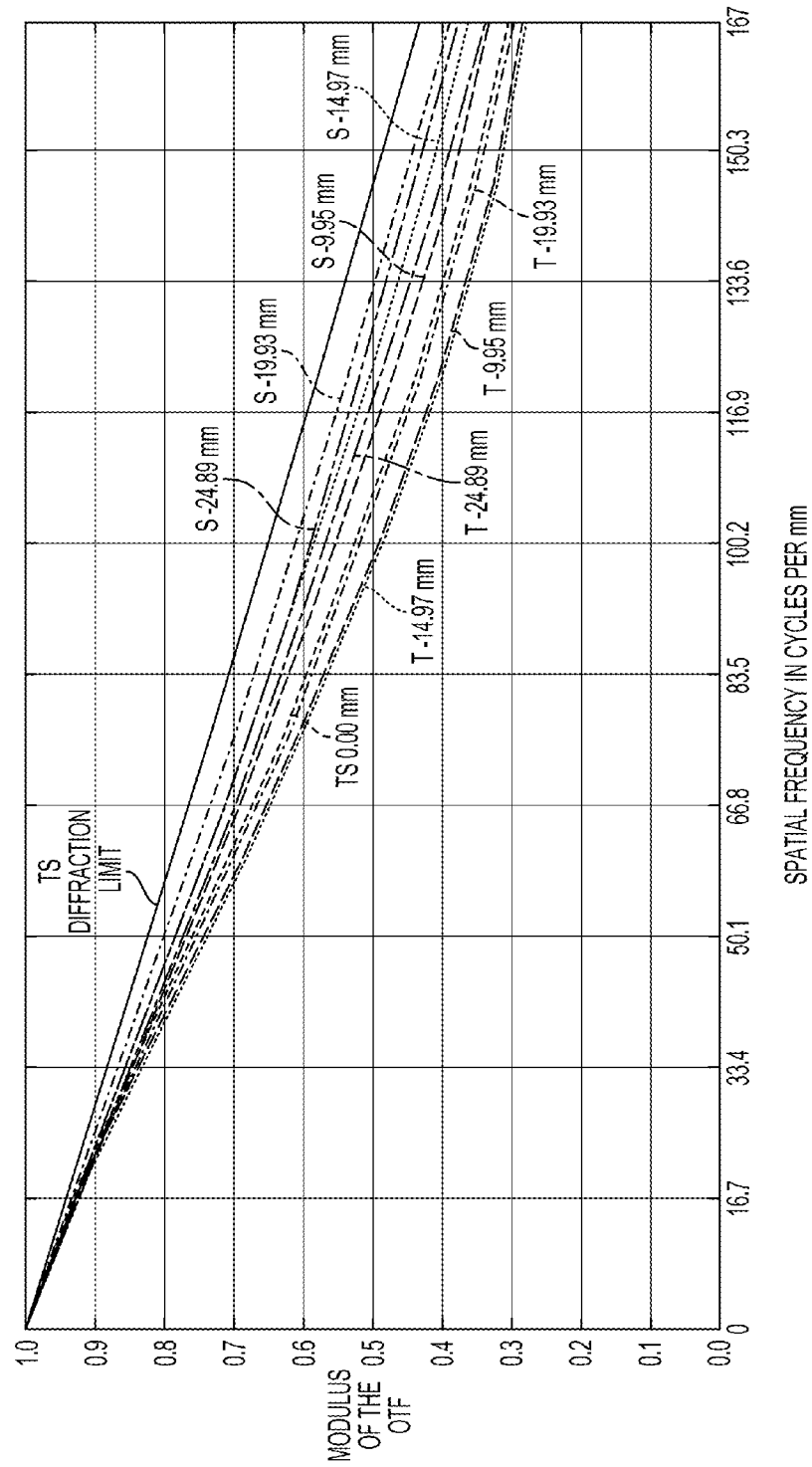
Figure 16:
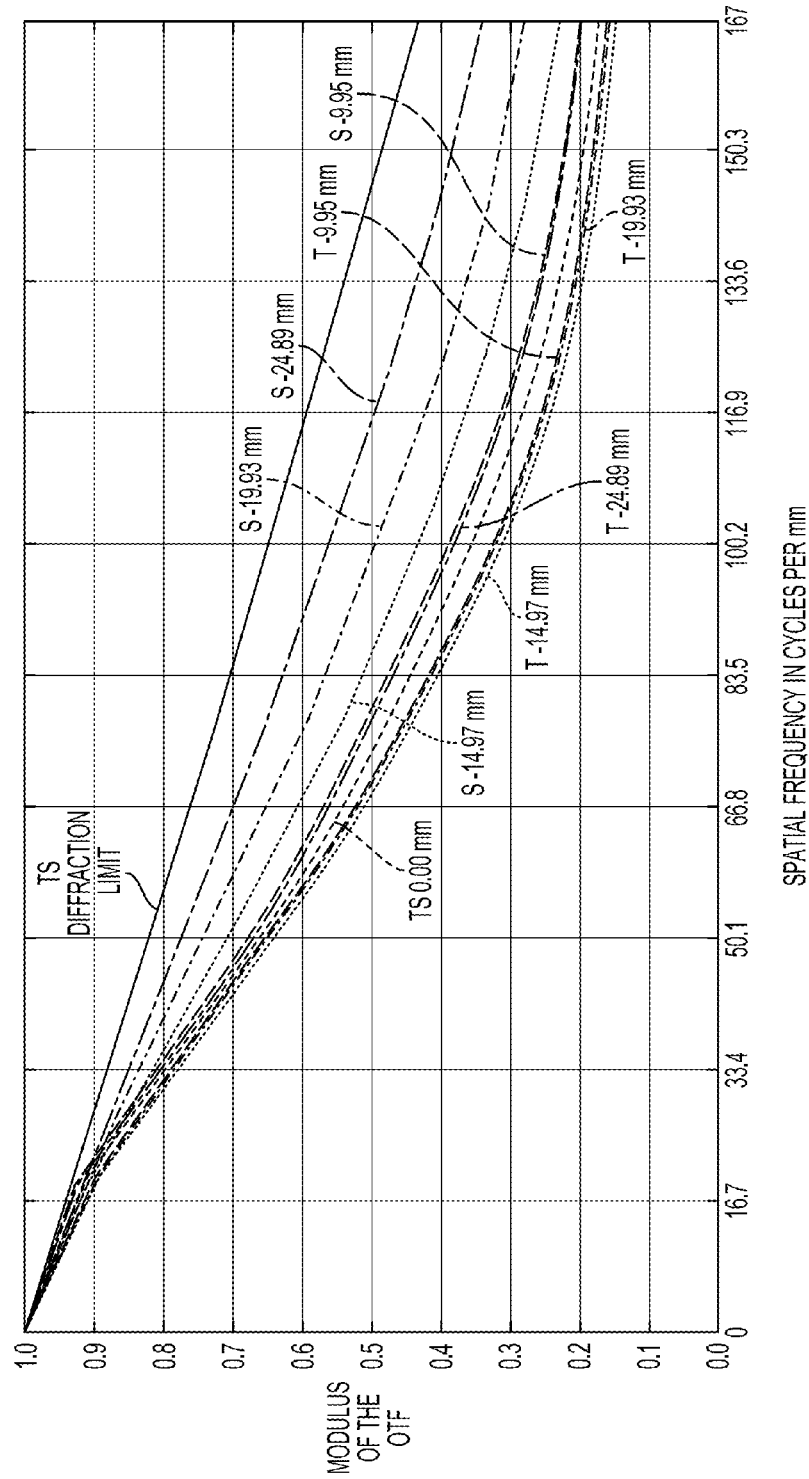

FIGS. 14, 15, and 16 illustrate diffraction modulation transfer functions (MTFs) for the example embodiment of the optical system 206 arranged in the camera 106 of FIG. 3. Two differences between these MTF curves and those in FIG. 5 are the distance to the object and the wavelength of captured light. Whereas in FIG. 5 the distance was 27 cm (close to the focal distance of the optical system), in FIG. 14 it is 25 cm, in FIG. 15 it is 30 cm, and in FIG. 16 it is 35 cm, representing the near boundary 412 of the depth of field 410, the middle of the depth of field 410, and the far boundary 414 of the depth of field 410. Also, whereas in FIG. 16 the wavelength of captured light was 750 nm, in FIGS. 14, 15, and 16 the captured light is a range of wavelengths from 766 nm to 794 nm. The line patterns used for the ray traces in FIGS. 3 and 4 corresponds to the line patterns used in the MTF plots in FIGS. 14, 15, and 16. The horizontal axes are the spatial frequency in cycles per millimeter, and the vertical axes are the absolute value of the modulus of the optical transfer function (OTF).

As demonstrated by the separation of the MTF curves at the near boundary (FIG. 14) and far boundary (FIG. 16), distortion increases at the edge of image at the boundaries of the depth of field 410. In comparison, in the middle of the depth of field (FIG. 15), there is less distortion at the edges. Dispersion of the difference wavelengths in the 28 nm range contributes to the distortion in all three MTFs, but as illustrated in FIG. 16 in the middle of the depth of field 410, the distortion is more pronounced overall but less dramatic at the edges.

To test the illuminator, a lens similar to that characterized in Table 3 was used, although with somewhat different dimensions. For testing, instead of a flat LED package, a Thorlabs ML780L3 780 nm mounted LED was used. As the lens 850, a Thorlabs APL0606 aspheric lens was used, which as a similar focal length (6.05 mm in comparison to 5.949 mm in Table 3) and a similar outer diameter (6.0 mm in comparison to 6.216 mm in Table 3). However, the Thorlabs APL0606 lens has a thickness of 4.5 mm, whereas the lens in Table 3 as a thickness of 2.9 mm, and is made of acrylic (optimized for 633 nm) instead of polycarbonate. However, since the diameters and focal lengths are similar, the results are believed to generally be demonstrative of what would be obtained using the lens described in Table 3.

Figure 17:
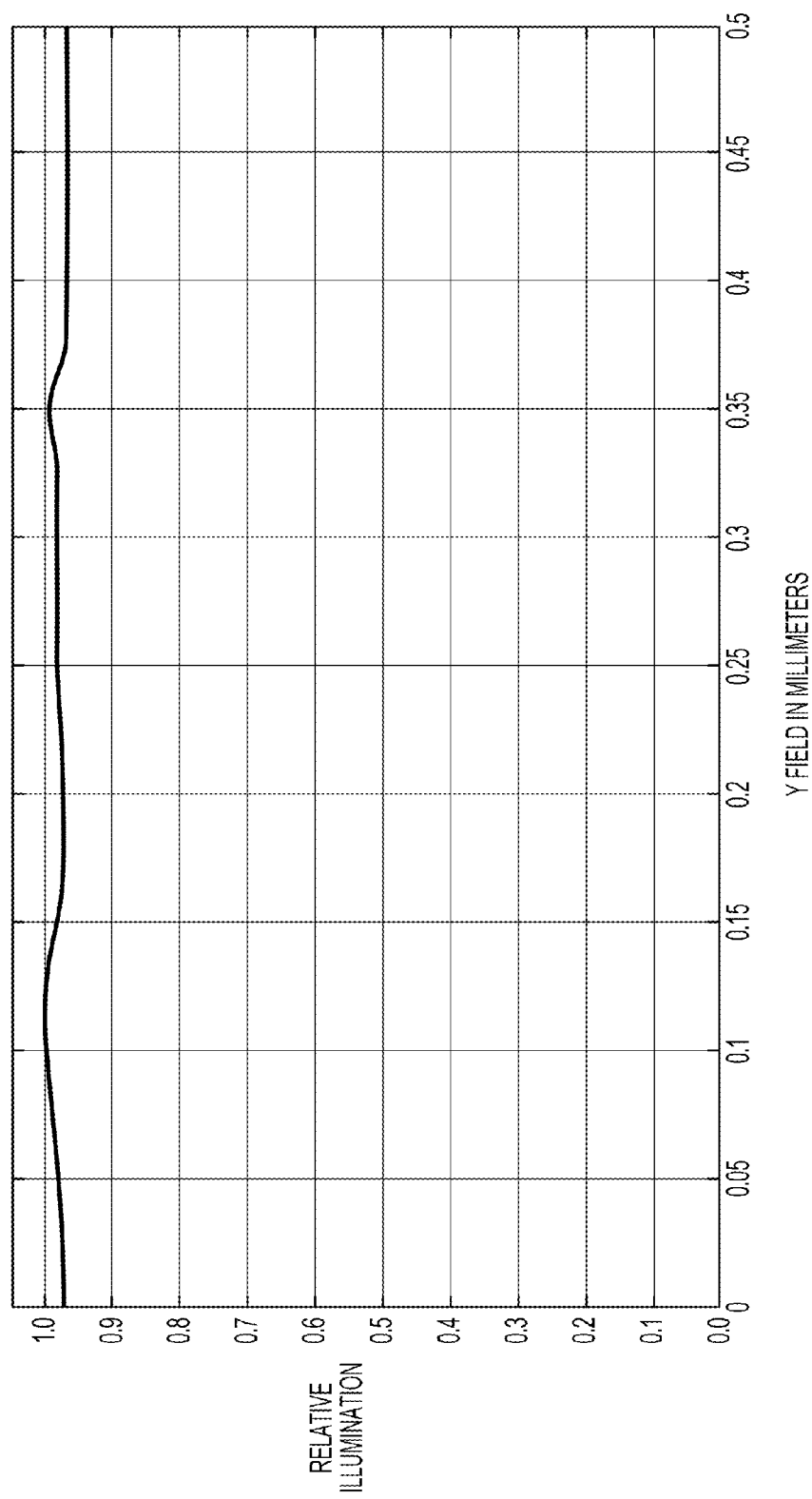
FIG. 17 illustrates relative illumination emitted by the light source in an example embodiment of the illuminator of FIG. 10 emitting near-infrared light at 780 nm.
Figure 18:
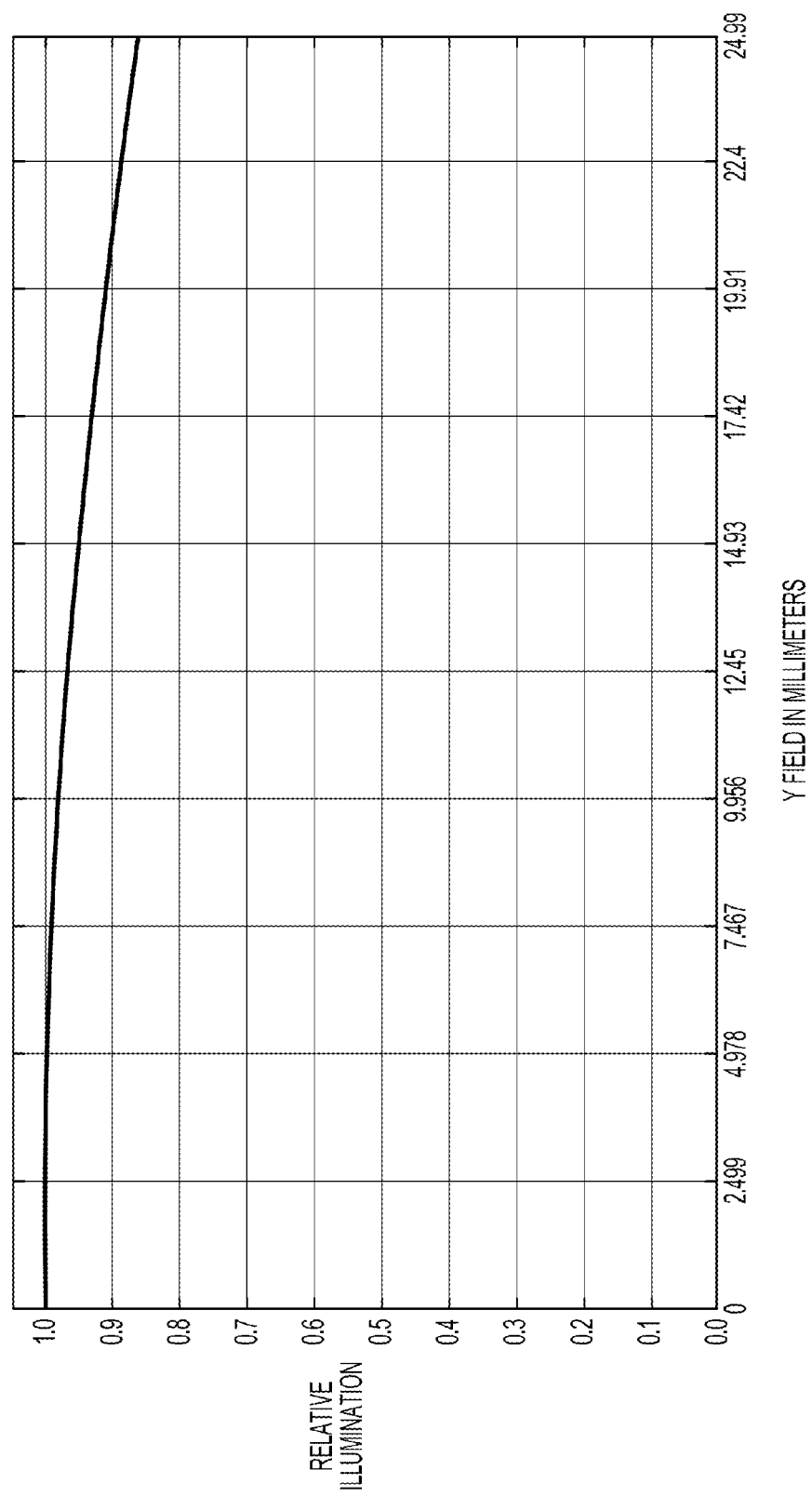
FIG. 18 illustrates relative illumination incident at a front of the depth of field of the camera using near-infrared light at 780 nm.
Figure 19:
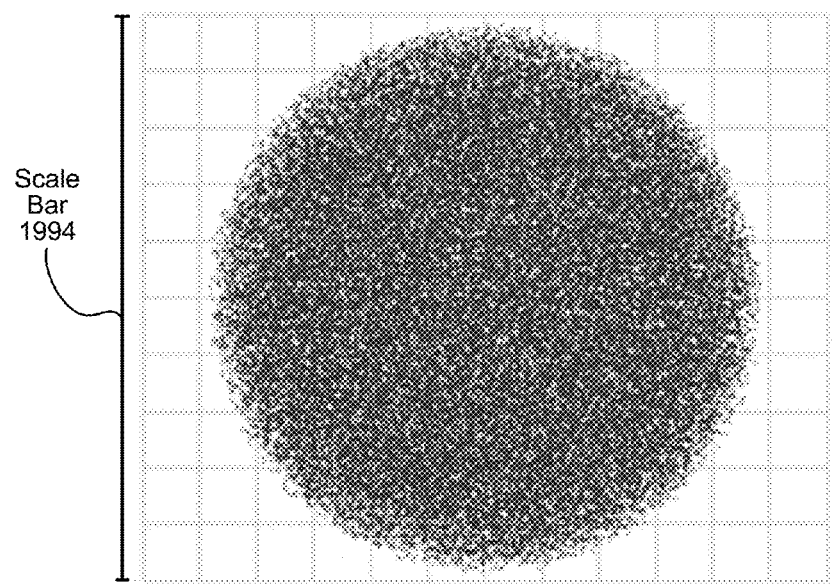
FIG. 19 illustrates an illumination pattern produced by the example embodiment of the illuminator at the front of the depth of field of the camera using near-infrared light at 780 nm.

FIG. 17 illustrates the relative illumination of the Thorlabs ML780L3 780 nm mounted LED from the illuminator axis 1092 to the edge of the aperture 820. FIG. 18 illustrated the relative illumination at an object plane set 25 cm from the illuminator. FIG. 19 illustrates the resulting illumination pattern at 25 cm. FIG. 19 is drawn to scale, with a scale bar 1994 having a length of 50.00 millimeters. The field position is 0.00 millimeters. The illumination efficiency is approximately 73.1%.

Figure 20:
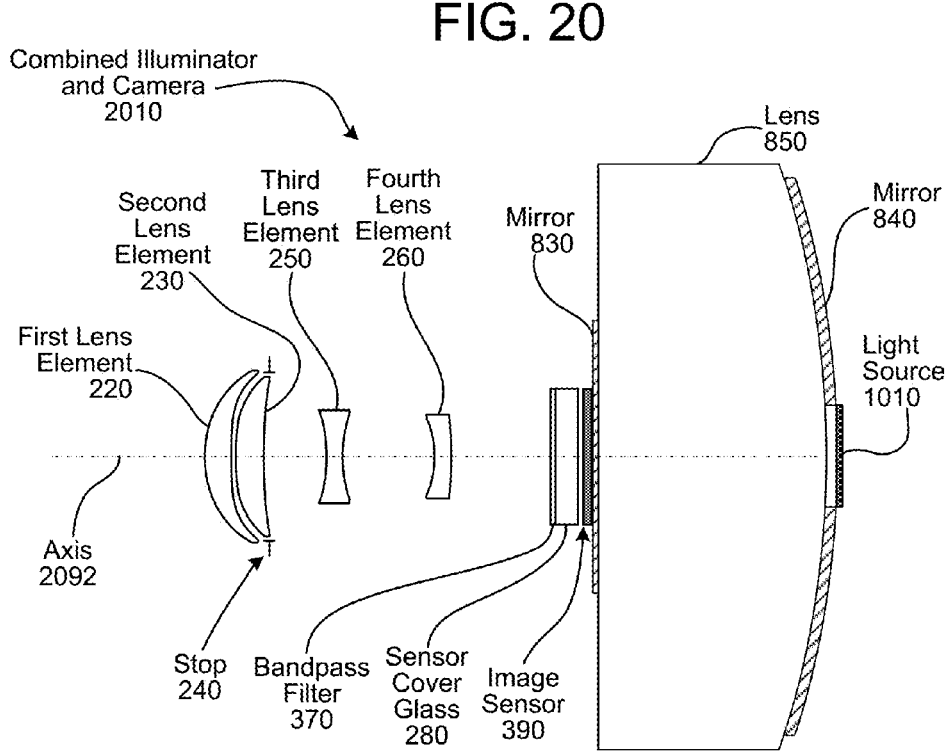
FIG. 20 illustrates a cross-section of a uniaxial arrangement of the camera and the illuminator.
Figure 21:
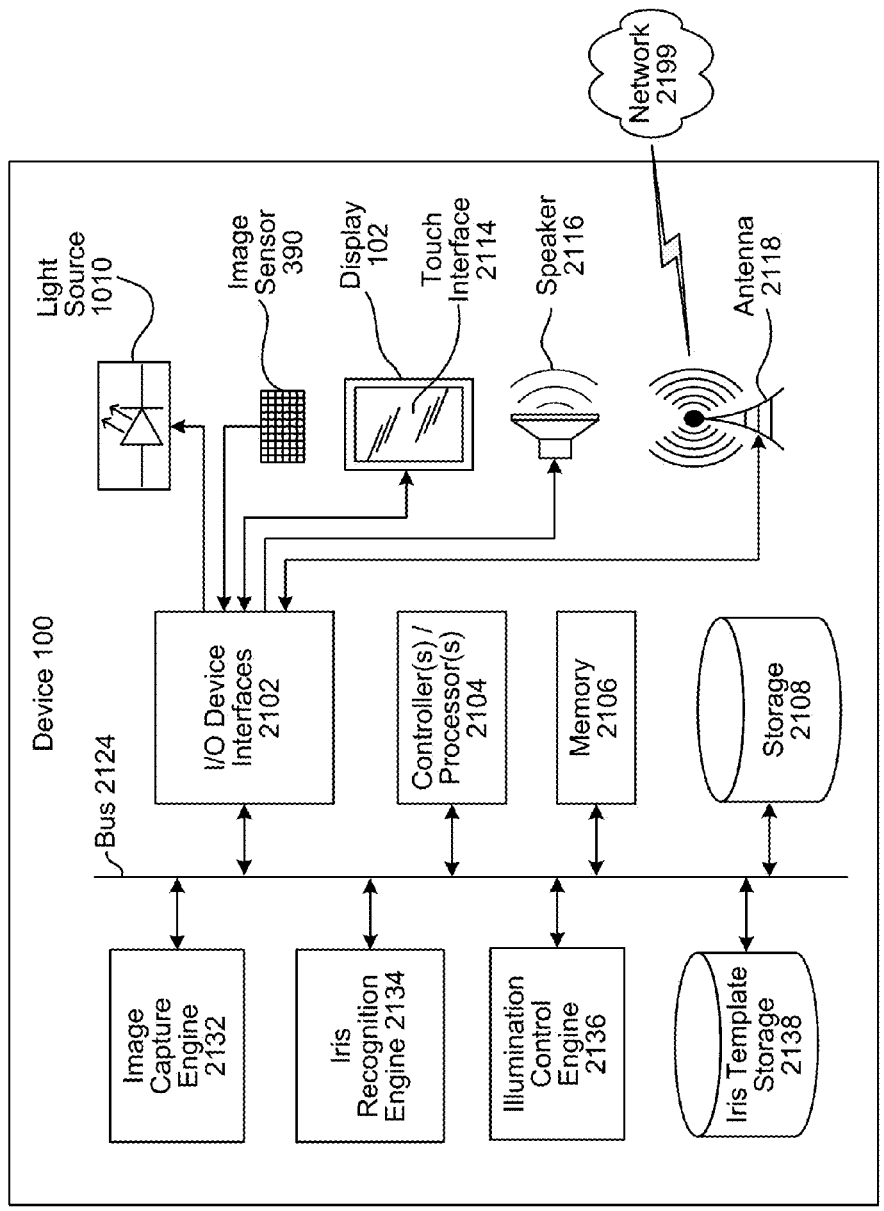
FIG. 21 is a block diagram conceptually illustrating example components of the electronic device of FIG. 1.

Overall device thickness is usually a desirable feature, such that the Cassegrain illuminator 104 and camera 106 may positioned side-by-side, adjacent to each other within device 100, as illustrated in FIG. 1. However, as the maximum diameter of an imaging lens is approximately 1.6 mm (first lens element 220), whereas the primary mirror 840 has a diameter of 6 mm, the camera and the illuminator can be arranged coaxially, as illustrated in FIG. 20. While the scale in FIG. 20 is not exact, it approximates a structure of a combined illuminator and camera (2010), sharing a common axis 2092. The image sensor 390 is mounted against the back of the secondary mirror 830. This design may be advantageous for door scanners and larger devices, allowing a single hole through a housing to provide both illumination and iris capture. Also, the combined design can be integrated within a single housing, simplifying assembly of the larger device and reducing the potential for misalignment between the axis of the camera 192 and the axis of the illuminator 1092. In FIG. 20, since the illuminator and camera axes are coextensive, if the beam angle 109 is minimized, the cross-sectional diameter of the cone of infrared light 108 may be approximately equal to the diagonal corner-to-corner distance across the object plane 111. FIG. 21 is a block diagram conceptually illustrating example components of the electronic device 100. In operation, the device 100 may include computer-readable and computer-executable instructions that reside in non-volatile storage on the device, as will be discussed further below.

The device 100 includes input/output device interfaces 2102. A variety of active components may be connected through the input/output device interfaces 2102, such as among other things, the light source 1010 of the Cassegrain illuminator 104, the image sensor 390 of the camera 106 arranged at the image plane 290 of the optical system 206, the display 102, a touch-sensitive interface 2114, a microphone, and a speaker 2116. The light source 1010 is a near infrared (NIR) light emitting diode (LED). The image sensor 390 may be of any technology, such as a complementary metal-oxide-semiconductor (CMOS) image sensor or a charge-coupled device (CCD) sensor, and comprises a grid of pixel sensors. The display 102 may also be of any suitable technology, such as a liquid crystal display, an organic light emitting diode display, an electrowetting display, or other suitable component(s).

The input/output device interfaces 2102 may also include an interface for an external peripheral device connection such as universal serial bus (USB), FireWire, Thunderbolt or other connection protocol. The input/output device interfaces 2102 may also include a connection to one or more networks 2199 via an Ethernet port, a wireless local area network (WLAN) (such as WiFi) radio, Bluetooth, and/or wireless network radio, such as a radio capable of communication with a wireless communication network such as a Long Term Evolution (LTE) network, WiMAX network, 3G network, etc. Wireless connectivity is illustrated in FIG. 21 through an antenna 2118 of the device 100.

The device 100 may include one or more controllers/processors 2104, that may each include a central processing unit (CPU) for processing data and computer-readable instructions, and a memory 2106 for storing data and instructions. The memory 2106 may include volatile random access memory (RAM), non-volatile read only memory (ROM), non-volatile magnetoresistive (MRAM) and/or other types of memory. The device 10 may also include a non-volatile data storage component 2108, for storing data and controller/processor-executable instructions. The data storage component 2108 may include one or more non-volatile storage types such as solid-state storage (e.g., Flash memory). The device 100 may also be connected to removable or external non-volatile memory and/or storage (such as a removable memory card, memory key drive, networked storage, etc.) through an input/output device interfaces 2102.

Computer instructions for operating the device 100 and its various components may be executed by the controller(s)/processor(s) 2104, using the memory 2106 as temporary "working" storage at runtime. The computer instructions may be stored in a non-transitory manner in non-volatile memory 2106, storage 2108, or an external device. Alternatively, some or all of the executable instructions may be embedded in hardware or firmware in addition to or instead of software.

The device 100 may include an address/data bus 2124 for conveying data among components of the device 100. Each component within the device 100 may also be directly connected to other components in addition to (or instead of) being connected to other components across the bus 2124.

The device 100 may include various engines that control the level of light emitted by the Cassegrain illuminator 104 and utilize data from the image sensor 390. These engines and controllers may include software stored in memory 2106 and/or storage 2108 to be executed by the controller(s)/processor(s) 2104, may include hardware, and combinations such software and hardware.

An example of such an engine is the image capture engine 2132, which operates in conjunction with image sensor 390. Among other things, the image capture engine 2132 controls the exposure time for each frame during which the image sensor 390 captures incident light, and reads image frame data from the image sensor 390. The exposure time is controlled to obtain a grayscale image with contrast that is suitable for iris recognition. The image capture engine 2132 may also apply a transform to the captured image frame data, reducing distortion to obtain a substantially rectilinear image for iris recognition. Although the image capture engine 2132 may comprise software or firmware operations on the controller(s)/processor(s) 2104, application specific integrated circuits (ASICs) are commercially available to manage image capture and apply firmware-specified transforms to reduce distortion.

Another engine is the iris recognition engine 2134. The iris recognition engine 2134 performs biometric identification using mathematical pattern-recognition on video frames received from the image capture engine 2132. The pattern recognition identifies an iris in the video frames and compares the pattern of the iris to one-or-more known patterns stored in iris data storage 2138. An example of an algorithm that may be used by the iris recognition engine 2134 is the algorithm developed by John Daugman first commercialized in the 1990's. For background on how such iris recognition algorithms works, see "How Iris Recognition Works" by John Daugman, IEEE Transactions On Circuits And Systems For Video Technology, Vol. 14, No. 1, January 2004 (pp. 21 to 30), and U.S. Pat. No. 5,291,560 A1 by John Daugman, issued Mar. 1, 1994. Iris storage 2138 may be a non-volatile portion of memory 2106 or storage 2108, or may be a separate dedicated non-volatile storage location (e.g., a separate Flash memory to isolate biometric data from general storage for improved security).

Another engine is the illumination control engine 2136. The illumination control engine turns the light source 1010 on and off. A more sophisticated implementation may use feedback from the image capture engine 2132 to determine the amount of illumination being received at the iris 14. and increase or decrease illumination accordingly.

Multiple devices 100 may be employed in a single system, and different devices may have different components. The illuminator 104 and the camera 106 may be remotely located from the processing-related components, with one device 100 capturing video frames of an iris and another device processing those frames (e.g., performing iris recognition).

The concepts disclosed herein may be applied within a number of different devices and computer systems, including, for example, general-purpose computing systems, biometric security systems, telephone computing systems, laptop computers, cellular phones, personal digital assistants (PDAs), tablet computers, wearable computing devices (e.g., watches), other mobile devices, etc.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of camera optics and lenses should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk and/or other media. In addition, one or more engines of the device 100 as firmware, such as a complete or partial hardware implementation of the image capture engine 2132 and the illumination control engine 2136 by an application specific integrated circuit (ASIC).

As used in this disclosure, the term "a" or "one" may include one or more items unless specifically stated otherwise. Further, the phrase "based on" is intended to mean "based at least in part on" unless specifically stated otherwise.

What is claimed is:

1. An iris recognition system comprising:
a camera comprising:
  a four-piece optical lens system, the four-piece optical lens system having a fixed focal distance and comprising, in order from an object side to an image side:
    a first lens element having a first refractive power that is positive, a convex object-side surface, and a concave image-side surface, both of the convex object-side surface and the concave image-side surface of the first lens element being aspheric;
    a second lens element having a second refractive power that is positive, a convex object-side surface, and a concave image-side surface, both of the convex object-side surface and the concave image-side surface of the second lens element being aspheric;
    a third lens element having a third refractive power that is negative, a concave object-side surface, and a concave image-side surface, both of the concave object-side surface and the concave image-side surface of the third lens element being aspheric; and
    a fourth lens element with a fourth refractive power that is negative, a concave object-side surface, and a convex image-side surface, both of the concave object-side surface and the convex image-side surface of the fourth lens element being aspheric; and
  a stop to block incident light not passing through the second lens element from reaching the third lens element;
  a bandpass filter between the image side of the first lens element and an image plane of the four-piece optical system, the bandpass filter having a pass band configured to transmit substantially monochromatic near-infrared light; and
  an image sensor arranged at the image plane of the four-piece optical lens system;
an illuminator proximate to the camera, the illuminator configured to emit a cone of light at a near-infrared wavelength within the pass band of the bandpass filter of the camera, the cone of light encompassing a field of view of the camera at the fixed focal distance;
a processor; and
a memory including at least one template encoded with a first pattern of a first iris, and instructions operable to be executed by the processor, to configure the at least one processor to (i) capture video data corresponding to a second iris, the video data including a second pattern of the second iris, and (ii) compare the second pattern of the second iris with the first pattern of the first iris, wherein:
  a field of view of the camera is between 5 and 15 degrees; and
  the fixed focal distance of the camera is between 25 and 35 centimeters.

2. The iris recognition system of claim 1, the illuminator comprising:
a fifth lens element having an approximately flat surface and a convex surface;
a first mirror covering a central portion of the approximately flat surface of the fifth lens element;
a second mirror having an annulus shape and covering a portion of the convex surface of the fifth lens element; and
a substantially monochromatic light source configured to direct the light at the fifth lens element through a central opening in the annulus shape of the second mirror,
wherein the illuminator emits the cone of light from the approximately flat surface of the fifth lens element around the first mirror.

3. The iris recognition system of claim 1, wherein a full-width half-maximum (FWHM) of the pass band of the bandpass filter that transmits the substantially monochromatic near-infrared light is approximately 20 nanometers.

4. A device comprising:
a four-piece optical lens system, the four-piece optical lens system having a fixed focal distance and comprising, in order from an object side to an image side:
  a first lens element having a first refractive power that is positive, a convex object-side surface, and a concave image-side surface, both of the convex object-side surface and the concave image-side surface of the first lens element being aspheric;
  a second lens element having a second refractive power that is positive, a convex object-side surface, and a concave image-side surface, both of the convex object-side surface and the concave image-side surface of the second lens element being aspheric;
  a third lens element having a third refractive power that is negative, a concave object-side surface, and a concave image-side surface, both of the concave object-side surface and the concave image-side surface of the third lens element being aspheric; and
  a fourth lens element with a fourth refractive power that is negative, a concave object-side surface, and a convex image-side surface, both of the concave object-side surface and the convex image-side surface of the fourth lens element being aspheric; and
a bandpass filter between the image side of the first lens element and an image plane of the four-piece optical system, the bandpass filter having a pass band configured to transmit substantially monochromatic near-infrared light;
an image sensor arranged at the image plane of the four-piece optical lens system; and
an illuminator proximate to the four-piece optical lens system, the illuminator configured to emit a cone of light at a near-infrared wavelength within the pass band of the bandpass filter.

5. The device of claim 4, arranged to provide a field-of-view between 5 and 15 degrees at the image plane of the four-piece optical lens system, the cone of light from the illuminator to encompass the field of view at the fixed focal distance.

6. The device of claim 5, the fixed focal distance of the four-piece optical system being between 25 and 35 cm.

7. The device of claim 4, wherein the four-piece optical system and the image sensor are configured so that an area of 1 mm by 1 mm at a surface orthogonal to an optical axis of the four-piece optical system at the fixed focal distance is to be resolved by the image sensor as at least 8 pixels by 8 pixels.

8. The device of claim 7, wherein an F-number of the four-piece optical lens system is 3.5 or larger.

9. The device of claim 4, the four-piece optical system to provide a depth of field including a range from 25 cm and 35 cm, the fixed focal distance being within the range, wherein the four-piece optical system and the image sensor are configured so that an area of 1 mm by 1 mm at a surface orthogonal to the optical axis of the four-piece optical system is to be resolved by the image sensor as at least 8 pixels by 8 pixels over an entirety of the range.

10. The device of claim 4, wherein a full-width half-maximum (FWHM) of the pass band of the bandpass filter is approximately 20 nanometers.

11. The device of claim 10, wherein a transmissivity peak of the pass band is at 750 nanometers.

12. The device of claim 4, wherein each lens element of the four-piece optical lens system is composed of a same plastic.

13. The device of claim 4, further comprising a stop to block incident light not passing through the second lens element from reaching the third lens element.

14. The device of claim 4, the illuminator comprising:
  a fifth lens element having an approximately flat surface and a convex surface;
  a first mirror covering a central portion of the approximately flat surface of the fifth lens element;
  a second mirror having an annulus shape and covering a portion of the convex surface of the fifth lens element; and
  a substantially monochromatic light source configured to direct the light at the fifth lens element through a central opening in the annulus shape of the second mirror,
  wherein the illuminator emits the cone of light from the approximately flat surface of the fifth lens element around the first mirror.

15. The device of claim 14, wherein the four-piece optical lens system and the fifth lens element are coaxial, the first mirror being between the image sensor and the fifth lens, wherein the illuminator emits the cone of light from the approximately flat surface of the fifth lens element around the first mirror, and around the four-piece optical lens system adjacent to the first mirror.

16. A device comprising:
  a camera that has a fixed focal distance, the camera comprising a bandpass filter, and in order from an object side to an image side:
    a first lens element having a first refractive power that is positive, a convex object-side surface, and a concave image-side surface, both of the convex object-side surface and the concave image-side surface of the first lens element being aspheric;
    a second lens element having a second refractive power that is positive, a convex object-side surface, and a concave image-side surface, both of the convex object-side surface and the concave image-side surface of the second lens element being aspheric;
    a third lens element having a third refractive power that is negative, a concave object-side surface, and a concave image-side surface, both of the concave object-side surface and the concave image-side surface of the third lens element being aspheric;
    a fourth lens element with a fourth refractive power that is negative, a concave object-side surface, and a convex image-side surface, both of the concave object-side surface and the convex image-side surface of the fourth lens element being aspheric; and
  an image sensor,
    wherein the bandpass filter comprises one-or-more filters, the bandpass filter having a pass band configured to allow only substantially monochromatic near-infrared light to reach the image sensor, and
  an illuminator proximate to the camera, and comprising a light source and a Cassegrain reflector, wherein the illuminator is configured to emit a cone of light including a near-infrared wavelength that is within the pass band of the bandpass filter.

17. The device of claim 16, the Cassegrain reflector comprising:
  a fifth lens element having an approximately flat surface and a convex surface;
  a first mirror covering a central portion of the approximately flat surface of the fifth lens element; and
  a second mirror having an annulus shape and covering a portion of the convex surface of the fifth lens element;
  wherein the light source is configured to emit light into the fifth lens element through a central opening in the annulus shape of the second mirror, and
  the illuminator emits the cone of light from the approximately flat surface of the fifth lens element around the first mirror.

18. The device of claim 16, wherein the camera and the Cassegrain reflector are coaxial, the illuminator arranged to emit the cone of light around the camera.

19. The device of claim 16, the camera having a field-of-view between 5 and 15 degrees, the cone of light from the illuminator to encompass the field of view at the fixed focal distance.

20. The device of claim 16, the camera to provide a depth of field including a range from 25 cm and 35 cm, the fixed focal distance being within the range.

* * * * *